US010028203B2

(12) United States Patent
Akkarakaran et al.

(10) Patent No.: US 10,028,203 B2
(45) Date of Patent: Jul. 17, 2018

(54) SYSTEM INFORMATION BLOCK TRANSMISSION

(71) Applicant: QUALCOMM Incorporated, San Diego, CA (US)

(72) Inventors: Sony Akkarakaran, Poway, CA (US); Tao Luo, San Diego, CA (US); Sumeeth Nagaraja, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/711,565

(22) Filed: Sep. 21, 2017

(65) Prior Publication Data
US 2018/0109995 A1    Apr. 19, 2018

Related U.S. Application Data

(60) Provisional application No. 62/408,658, filed on Oct. 14, 2016.

(51) Int. Cl.
*H04W 48/12* (2009.01)
*H04W 72/04* (2009.01)
(Continued)

(52) U.S. Cl.
CPC ......... *H04W 48/12* (2013.01); *H04W 72/042* (2013.01); *H04W 72/0453* (2013.01); *H04W 74/004* (2013.01); *H04W 48/10* (2013.01)

(58) Field of Classification Search
CPC ............. H04W 48/12; H04W 72/0453; H04W 72/042; H04W 74/004
See application file for complete search history.

(56) References Cited

U.S. PATENT DOCUMENTS 8,855,658 B2    10/2014   Charbit et al.
2003/0161283 A1*  8/2003   Tiedemann, Jr. .... H04B 7/2634
                                                           370/329
(Continued)

FOREIGN PATENT DOCUMENTS

WO    WO-2013006379 A1    1/2013
WO    WO2014059591 A1     4/2014

OTHER PUBLICATIONS

3GPP TSG-RAN WG2 Meeting #95, 36.331, "Change Request", CR 2263, 13.2.0, R2-164888, Gothenburg, Sweden, Aug. 22-26, 2016, pp. 1-15.
(Continued)

*Primary Examiner* — Ronald B Abelson
(74) *Attorney, Agent, or Firm* — Clint R. Morin; Holland & Hart

(57) ABSTRACT

Methods, systems, and devices for wireless communication are described. A network entity may identify a first frequency range of a system bandwidth that is used for transmission of synchronization information. The network may identify a second frequency range of the system bandwidth that is used for transmission of common control information. The second frequency range may be a function of the first frequency range. The first and second frequency ranges may be less than the system bandwidth. In some cases, the second frequency range and the first frequency range may be a same frequency range. The network entity may transmit the common control information on a frequency within the second frequency range of the system bandwidth.

26 Claims, 17 Drawing Sheets

(51) Int. Cl.
*H04W 74/00* (2009.01)
*H04W 48/10* (2009.01)

(56) References Cited

U.S. PATENT DOCUMENTS

2013/0195019 A1  8/2013  Lindh et al.
2014/0126494 A1  5/2014  Charbit

OTHER PUBLICATIONS

ISA/EP, International Search Report and Written Opinion of the International Searching Authority, Int'l Application No. PCT/US2017/053009, dated Nov. 30, 2017, European Patent Office, Rijswijk, NL, 14 pgs.
NTT DOCOMO, Inc. "Discussion on Initial Access Design for NR," 3GPP TSG RAN WG1 Meeting #86bis, R1-1610073, Lisbon, Portugal, Oct. 10-14, 2016, 7 pgs., XP051150098, 3rd Generation Partnership Project.
Qualcomm Incorporated, "Single Beam Synchronization Design," 3GPP TSG-RAN WG1 Meeting #86b, R1-1610156, Lisbon, Portugal, Sep. 10-14, 2016, 6 pgs., XP051150179, 3rd Generation Partnership Project.

* cited by examiner

SYSTEM INFORMATION BLOCK TRANSMISSION

CROSS REFERENCES

The present Application for Patent claims priority to U.S. Provisional Patent Application No. 62/408,658 by Akkarakaran, et al., entitled "System Information Block Transmission," filed Oct. 14, 2016, assigned to the assignee hereof.

BACKGROUND

The following relates generally to wireless communication, and more specifically to system information block transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

By way of example, a wireless multiple-access communication system may include a number of base stations, each simultaneously supporting communication for multiple communication devices (e.g., UEs). A base station may communicate with UEs on downlink channels (e.g., for transmissions from a base station to a UE) and uplink channels (e.g., for transmissions from a UE to a base station).

Certain wireless systems may use short synchronization symbols, which may result in increased complexity for the device searching for the wireless system. To reduce this complexity, the synchronization and possibly broadcast signals (such as signals broadcast on a physical broadcast channel (PBCH) as used in some wireless systems) may be sent on a coarse frequency raster, which may limit the number of raster points to be searched. However, the system bandwidth may be allocated over a finer raster to enable flexible spectrum allocation in multiple frequency bands, geographical locations, and across both licensed and shared spectrum. This may imply an offset, also referred to as a raster offset, between the center of the bandwidth occupied by the synchronization information (such as primary synchronization signal (PSS), secondary synchronization signal (SSS), PBCH signals, etc.) and the system bandwidth over which the remaining data traffic, including broadcast system-information messages (such as system information blocks (SIBs)) may be transmitted. Non-zero raster offsets, together with a need for wireless systems to support UEs with different bandwidth capabilities, may support a need for improved procedures for transmitting SIB messages

SUMMARY

The described techniques relate to improved methods, systems, devices, or apparatuses that support efficient system information block (SIB) transmission in a wireless communication system. Generally, the described techniques provide for a user equipment (UE) accessing a frequency range used for common control information based on a frequency range used for transmission of synchronization information. The frequency range used for transmission of the synchronization information may generally be known a priori, e.g., preconfigured, such that a UE initializing in a new location or within a new wireless communication system may know which frequencies to search for the synchronization information. The frequency range used for transmission of the common control information may be the same as and/or a function of the frequency range used for the transmission of the synchronization information. Thus, the UE may access the frequency range used for the common control information to identify or otherwise determine other system information, such as the system bandwidth, raster offset, etc.

A method of wireless communication is described. The method may include identifying a first frequency range of a system bandwidth used for transmission of a synchronization information, identifying a second frequency range of the system bandwidth used for transmission of common control information, the second frequency range of the system bandwidth being a first function of the first frequency range of the system bandwidth, and the first frequency range and the second frequency range each being less than the system bandwidth, and receiving the common control information within the identified second frequency range of the system bandwidth.

An apparatus for wireless communication is described. The apparatus may include means for identifying a first frequency range of a system bandwidth used for transmission of a synchronization information, means for identifying a second frequency range of the system bandwidth used for transmission of common control information, the second frequency range of the system bandwidth being a first function of the first frequency range of the system bandwidth, and the first frequency range and the second frequency range each being less than the system bandwidth, and means for receiving the common control information within the identified second frequency range of the system bandwidth.

Another apparatus for wireless communication is described. The apparatus may include a processor, memory in electronic communication with the processor, and instructions stored in the memory. The instructions may be operable to cause the processor to identify a first frequency range of a system bandwidth used for transmission of a synchronization information, identify a second frequency range of the system bandwidth used for transmission of common control information, the second frequency range of the system bandwidth being a first function of the first frequency range of the system bandwidth, and the first frequency range and the second frequency range each being less than the system bandwidth, and receive the common control information within the identified second frequency range of the system bandwidth.

A non-transitory computer readable medium for wireless communication is described. The non-transitory computer-readable medium may include instructions operable to cause a processor to identify a first frequency range of a system bandwidth used for transmission of a synchronization information, identify a second frequency range of the system bandwidth used for transmission of common control information, the second frequency range of the system bandwidth being a first function of the first frequency range of the system bandwidth, and the first frequency range and the second frequency range each being less than the system bandwidth, and receive the common control information within the identified second frequency range of the system bandwidth.

In some examples of the method, apparatus, and non-transitory computer-readable medium described above, the first frequency range and the second frequency range may be a same frequency range.

Some examples of the method, apparatus, and non-transitory computer-readable medium described above may further include processes, features, means, or instructions for descrambling a reference signal used to decode the common control information according to a scrambling scheme, the scrambling scheme being a second function of the first frequency range of the system bandwidth.

In some examples of the method, apparatus, and non-transitory computer-readable medium described above, the scrambling scheme comprises use of a scrambling sequence to scramble the reference signal associated with the second frequency range that may be different from a system scrambling sequence to scramble other reference signals associated with frequencies outside of the second frequency range.

In some examples of the method, apparatus, and non-transitory computer-readable medium described above, the scrambling scheme comprises use of a mid-tone scrambling sequence that begins at a center frequency of the second frequency range and proceeds outward through the system bandwidth.

Some examples of the method, apparatus, and non-transitory computer-readable medium described above may further include processes, features, means, or instructions for identifying a third frequency range of the system bandwidth used for transmission of one or more messages associated with a random access channel (RACH) procedure, the third frequency range being a third function of the first frequency range of the system bandwidth.

Some examples of the method, apparatus, and non-transitory computer-readable medium described above may further include processes, features, means, or instructions for transmitting a pre-RACH transmission to a base station at a frequency within the third frequency range. Some examples of the method, apparatus, and non-transitory computer-readable medium described above may further include processes, features, means, or instructions for receiving, responsive to the pre-RACH transmission, the common control information from the base station.

In some examples of the method, apparatus, and non-transitory computer-readable medium described above, the common control information may be received according to a beamforming direction that may be indicated by the pre-RACH transmission.

In some examples of the method, apparatus, and non-transitory computer-readable medium described above, the common control information comprises a downlink transmission, the downlink transmission comprising a SIB transmitted on a physical downlink control channel (PDCCH) or a downlink grant for a physical downlink shared channel (PDSCH) carrying the SIB.

In some examples of the method, apparatus, and non-transitory computer-readable medium described above, the common control information comprises a SIB, the SIB indicating the system bandwidth, a raster offset, or both.

Some examples of the method, apparatus, and non-transitory computer-readable medium described above may further include processes, features, means, or instructions for receiving the common control information according to a cyclic shift pattern, wherein the cyclic shift pattern comprises one or more blocks of tones conveying the common control information.

In some examples of the method, apparatus, and non-transitory computer-readable medium described above, the synchronization information comprises at least one of a primary synchronization signal (PSS), a secondary synchronization signal (SSS), a broadcast signal, a physical broadcast channel (PBCH), or any combination thereof.

A method of wireless communication is described. The method may include identifying a first frequency range of a system bandwidth used for transmission of synchronization information, selecting a second frequency range of the system bandwidth used for transmission of common control information, the second frequency range of the system bandwidth being a first function of the first frequency range of the system bandwidth, and the first frequency range and the second frequency range each being less than the system bandwidth, and transmitting the common control information at a frequency within the selected second frequency range of the system bandwidth.

An apparatus for wireless communication is described. The apparatus may include means for identifying a first frequency range of a system bandwidth used for transmission of synchronization information, means for selecting a second frequency range of the system bandwidth used for transmission of common control information, the second frequency range of the system bandwidth being a first function of the first frequency range of the system bandwidth, and the first frequency range and the second frequency range each being less than the system bandwidth, and means for transmitting the common control information at a frequency within the selected second frequency range of the system bandwidth.

Another apparatus for wireless communication is described. The apparatus may include a processor, memory in electronic communication with the processor, and instructions stored in the memory. The instructions may be operable to cause the processor to identify a first frequency range of a system bandwidth used for transmission of synchronization information, select a second frequency range of the system bandwidth used for transmission of common control information, the second frequency range of the system bandwidth being a first function of the first frequency range of the system bandwidth, and the first frequency range and the second frequency range each being less than the system bandwidth, and transmit the common control information at a frequency within the selected second frequency range of the system bandwidth.

A non-transitory computer readable medium for wireless communication is described. The non-transitory computer-readable medium may include instructions operable to cause a processor to identify a first frequency range of a system bandwidth used for transmission of synchronization information, select a second frequency range of the system bandwidth used for transmission of common control information, the second frequency range of the system bandwidth being a first function of the first frequency range of the system bandwidth, and the first frequency range and the second frequency range each being less than the system bandwidth, and transmit the common control information at a frequency within the selected second frequency range of the system bandwidth.

In some examples of the method, apparatus, and non-transitory computer-readable medium described above, the first frequency range and the second frequency range may be a same frequency range.

Some examples of the method, apparatus, and non-transitory computer-readable medium described above may further include processes, features, means, or instructions for selecting a scrambling scheme for a reference signal used to decode the common control information, the scrambling scheme being a second function of the first frequency range of the system bandwidth.

Some examples of the method, apparatus, and non-transitory computer-readable medium described above may further include processes, features, means, or instructions for selecting a third frequency range of the system bandwidth used for transmissions of one or more messages associated with a RACH procedure, the third frequency range being a third function of the first frequency range of the system bandwidth.

Some examples of the method, apparatus, and non-transitory computer-readable medium described above may further include processes, features, means, or instructions for receiving a pre-RACH transmission from a UE at a frequency within the third frequency range. Some examples of the method, apparatus, and non-transitory computer-readable medium described above may further include processes, features, means, or instructions for transmitting, responsive to receiving the pre-RACH transmission, the common control information to the UE.

In some examples of the method, apparatus, and non-transitory computer-readable medium described above, the common control information may be transmitted according to a beamforming direction that may be indicated by the pre-RACH transmission.

Some examples of the method, apparatus, and non-transitory computer-readable medium described above may further include processes, features, means, or instructions for selecting a cyclic shift pattern for one or more blocks of tones conveying the common control information. Some examples of the method, apparatus, and non-transitory computer-readable medium described above may further include processes, features, means, or instructions for transmitting the common control information according to the cyclic shift pattern.

Some examples of the method, apparatus, and non-transitory computer-readable medium described above may further include processes, features, means, or instructions for selecting a set of clusters for a multi-cluster discrete Fourier transform-spread-orthogonal frequency division multiplexing (DFT-s-OFDM) scheme, wherein each cluster in the multi-cluster DFT-s-OFDM scheme may be associated with a different discrete Fourier transform (DFT) spreading function, wherein the set of clusters identify the one or more blocks of tones. Some examples of the method, apparatus, and non-transitory computer-readable medium described above may further include processes, features, means, or instructions for transmitting the common control information according to the set of clusters.

In some examples of the method, apparatus, and non-transitory computer-readable medium described above, the common control information comprises a downlink transmission, the downlink transmission comprising a SIB transmitted on a PDCCH or a downlink grant for a PDSCH carrying the SIB.

Some examples of the method, apparatus, and non-transitory computer-readable medium described above may further include processes, features, means, or instructions for transmitting the SIB in the common control information using a fixed frequency allocation, a known modulation order, a known scrambling order, or a combination thereof.

Some examples of the method, apparatus, and non-transitory computer-readable medium described above may further include processes, features, means, or instructions for encoding the synchronization information to convey information associated with a SIB, wherein the information may be a fourth function of the synchronization information.

DETAILED DESCRIPTION

Certain wireless communication systems may be configured such that the channelization used for all downlink and uplink channels, with the exception of channels (or frequencies) used for synchronization information, is defined for a user equipment (UE) once the UE knows the system bandwidth and raster offset. The channelization may refer to the tone mapping in systems based on variants of orthogonal frequency division multiplexing (OFDM) techniques, based on scrambling sequences, based on a defined search space in which the UE knows to look to receive the downlink control channel (such as common control information), etc. Such wireless communications systems may use base stations broadcasting on a channel (such as a physical broadcast channel (PBCH)) a portion of the system information, such as system bandwidth, raster offset, etc. The UE may determine the remaining portion of the system information using multiple-hypothesis blind decoding, for example. Such broadcast signals, however, may be associated with increased overhead, for example in systems that support beamformed transmissions (e.g., which may be used to compensate for signal attenuation in a millimeter wave (mmW) wireless communication system). Such systems may use narrow beams to broadcast the signals which may require beam sweeping and/or increased coding redundancy to compensate for reduced penetration of the signals. Also, multiple hypothesis blind decoding for the UE may contribute to increased UE complexity.

Aspects of the disclosure are initially described in the context of a wireless communication system. A network entity and a UE may know a frequency range that is used for transmission of synchronization information (e.g., a first frequency range). The network entity may select a frequency range to be used for transmission of common control information (e.g., a second frequency range) based on the frequency range used for the transmission of the synchronization information. For example, the first frequency range may convey a location of a PBCH in a time-frequency grid, and the location of the PBCH may inform the location of the second frequency range. Thus, a UE performing an initial search and synchronization may know the second frequency range based on or as a function of the first frequency range.

Figure 1:
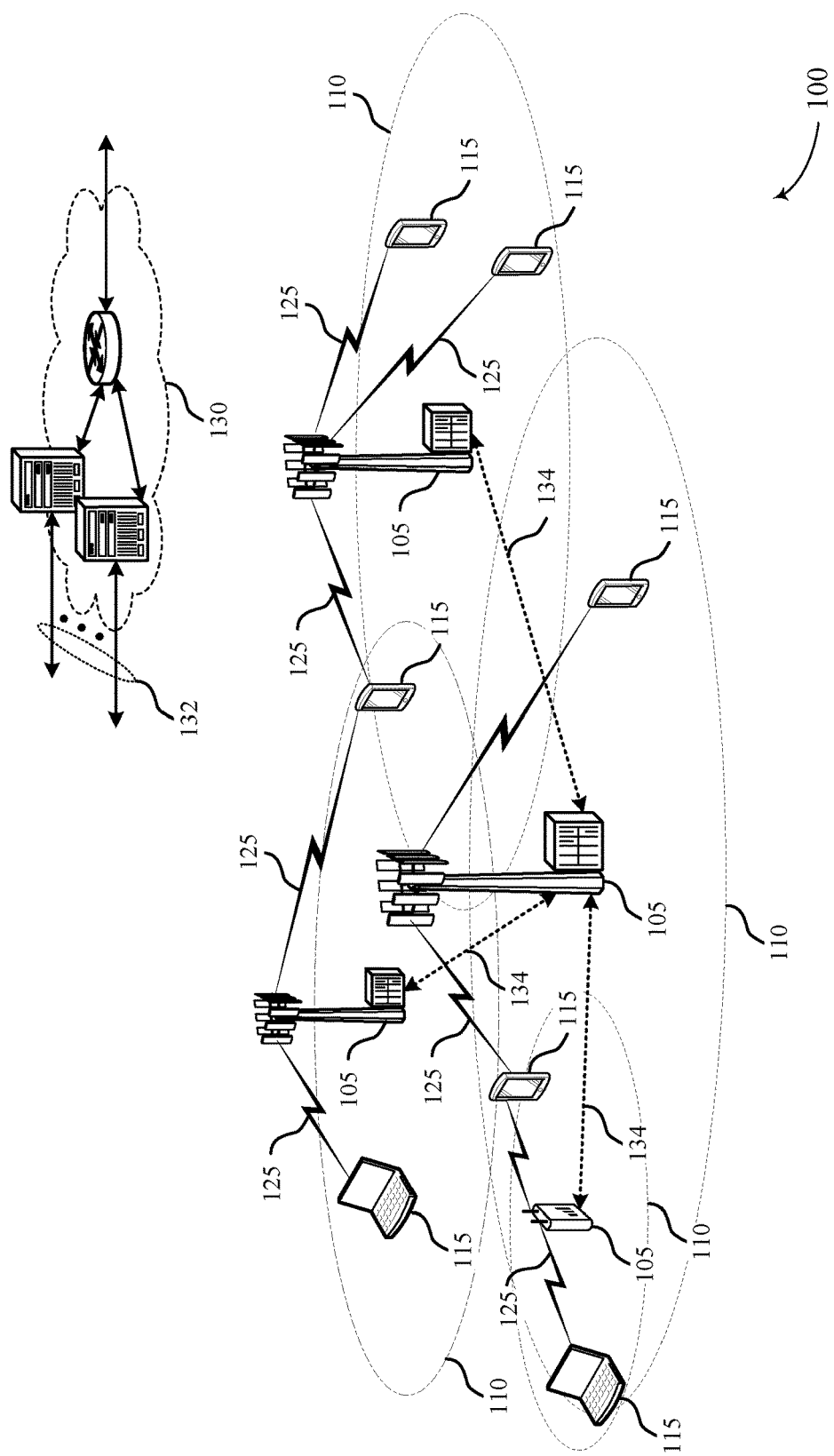
FIG. 1 illustrates an example of a system for wireless communication that supports system information block transmission in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) or LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Core network 130, or a component thereof, may be an example of a network entity configured to support aspects of the described techniques. Example components of a core network 130 may include, but are not limited to, a mobility management entity (MME), a home subscriber server (HSS), one or more gateways, and the like, which may be configured to support the described techniques.

In some cases, wireless communication system 100 may utilize different portions of the radio frequency spectrum band. In some examples, wireless communication system 100 may utilize one or more of an unlicensed spectrum, a licensed spectrum, a lightly licensed spectrum, licensed assisted access (e.g., licensed plus unlicensed spectrum), sub-6 GHz spectrum, millimeter-wave (mmW) spectrum, etc.

In some aspects, a network entity (such as core network 130 (or a component of core network 130) and/or a base station 105) may be configured for SIB transmission in accordance with aspects of the present disclosure. For example, the network entity may identify a first frequency range of a system bandwidth that is used for transmission of synchronization information. The network entity may select a second frequency range of the system bandwidth that is used for transmission of common control information. The second frequency range of the system bandwidth may be based on or a function of the first frequency range of the system bandwidth. The first and second frequency ranges may be less than the system bandwidth. The network entity may transmit the common control information at a frequency within the selected second frequency range of the system bandwidth.

A receiving device, such as a UE 115, may identify a first frequency range of a system bandwidth that is used for transmission of synchronization information. The UE 115 may identify a second frequency range of the system bandwidth that is used for transmission of a common control information. The second frequency range of the system bandwidth may be based on or a function of the first frequency range of the system bandwidth. The first and second frequency ranges may be less than the system bandwidth. The UE 115 may receive the common control information at a frequency within the identified second frequency range of the system bandwidth.

Figure 2:
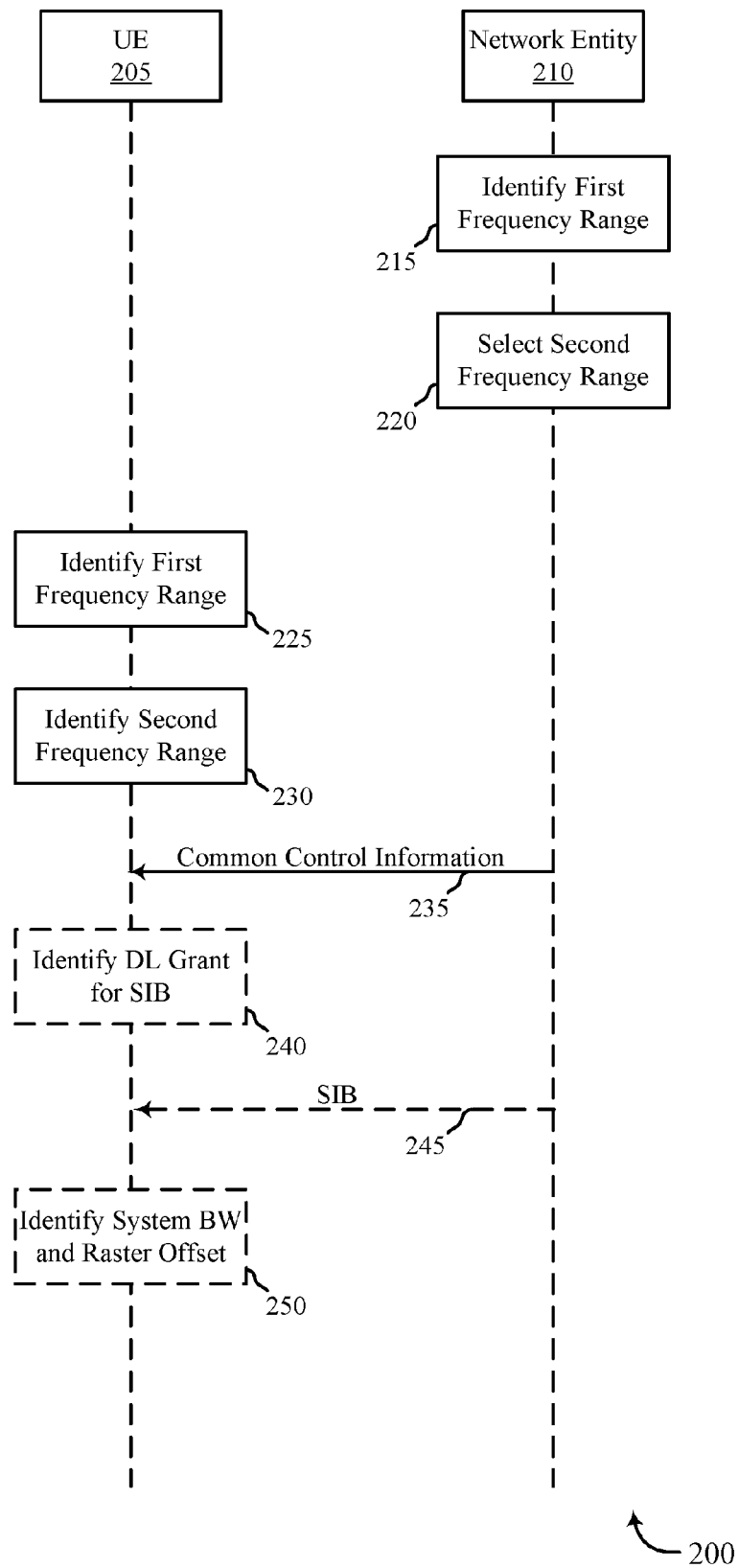
FIG. 2 illustrates an example of a process flow that supports system information block transmission in accordance with aspects of the present disclosure.

FIG. 2 illustrates an example of a process flow 200 for system information block transmission. Process flow 200 may implement one or more aspects of wireless communication system 100 of FIG. 1. Process flow 200 may include a UE 205 and a network entity 210, which may be examples of the corresponding devices of FIG. 1.

Broadly, process flow 200 may implement an example process where the channelization of the downlink grants and definition of the common search space (e.g., second frequency range) is based on or a function of the bandwidth occupancy (e.g., first frequency range) of the synchronization signals. The common search space may occupy the same frequency range as the synchronization signals. For example, the frequency range of the common search space could be a function of the bandwidth occupied by the synchronization signals and of any broadcast information already decoded (e.g., broadcast signals from a PBCH). Examples of the earlier decoded information may include, but is not limited to, a frame or a subframe index.

At 215, the network entity 210 may identify the first frequency range of a system bandwidth used for transmission of synchronization information. The first frequency range of the system bandwidth may be known or preconfigured for the wireless communication system. The synchronization information may include one or more of a primary synchronization signal (PSS), a secondary synchronization signal (SSS), a broadcast signal, a physical broadcast channel (PBCH), and the like.

In some aspects, the synchronization information may be encoded to convey an indication or information associated with the SIB, the information being a function of the synchronization information. For example, network entity 210 may avoid scheduling grants for SIBs by pre-configuring information in those grants to be a function of broadcast information that UE 205 has previously decoded, e.g., prior to reading the SIBs.

At 220, the network entity 210 may select the second frequency range of the system bandwidth that is used for the transmission of the common control information. The second frequency range may be selected based on the first frequency range. For example, the second frequency range may be the same frequency range as the first frequency range, may be offset a predetermined distance up or down from the first frequency range, may include a subset or superset of frequencies selected based on the first frequency range, and the like.

In some aspects, the common control information may include a downlink grant that is transmitted on a physical downlink control channel (PDCCH). Alternatively, the downlink grant may be for a physical downlink shared channel (PDSCH) carrying the system information. The downlink grant may provide an indication of a resource used to convey a SIB. The SIB may contain additional information associated with the wireless communication system, such as the system bandwidth, the raster offset, and the like. Thus, network entity 210 may configure the common control information to convey an indication of the SIB grant.

In some aspects, the common control information may include the SIB that indicates or otherwise includes information associated with the system bandwidth and the raster offset. In this example, the SIB may be transmitted according to a fixed frequency allocation, using a known modulation order, using a known scrambling sequence or order, or the like. In some aspects, the SIB included in the common control information may include all information traditionally conveyed in a downlink grant. In some aspects, the SIB included in the common control information may be transmitted in a fixed set of subframes or slots. In various examples, a subframe or a slot may be used (in some cases interchangeably) to illustrate a basic transmission time interval (TTI). In some aspects, the information included in the SIB of the common control information may be time-varying rather than fixed, provided that the time-variation may be a function of parameters already decoded from the synchronization information. This information may be preconfigured such that UE 205 and network entity 210 know which frequency allocation, modulation order, etc., are associated with the SIB included in the common control information. In some aspects, the SIB included in the common control information may be broadcast.

At 225, the UE 205 may identify the first frequency range that is used for transmission of synchronization information. As discussed above, the first frequency range may be preconfigured and therefore UE 205 may know the first frequency range a priori.

At 230, the UE 205 may identify the second frequency range that is used for the transmission of common control information. As discussed above, the second frequency range may be based on the first frequency range, e.g., may be the same frequency range, may be a function of the first frequency range, and the like. Generally, UE 205 may have preconfigured information associated with the relationship between the first frequency range and the second frequency range, e.g., information that may be used to derive the second frequency range based at least in part on the first frequency range. UE 205 may use this preconfigured information to identify the second frequency range.

At 235, the network entity 210 may transmit (and UE 205 may receive) the common control information, e.g., via a base station. As discussed, the common control information may include a downlink grant, may include a SIB that indicates the system bandwidth and raster offset, etc.

In some aspects, the common control information may include a downlink grant and use a scrambling scheme on a reference signal that is used to decode the common control information. For example, a scrambling scheme may be a function of the first frequency range. The scrambling scheme may be different from a system scrambling scheme (e.g., the scrambling scheme used to scramble other reference signals associated with frequencies outside of the second frequency range). As the second frequency range is based on or a function of the first frequency range, the scrambling scheme may also be said to be associated with the first frequency range of the system bandwidth.

Broadly, the scrambling of the reference signals used to decode the downlink grant (e.g., the downlink grant carried in the PDCCH that identifies the resource allocation for SIB) may be done beginning from the center of the second frequency range and then proceed out towards the edges of the system bandwidth. As another alternative approach, a scrambling scheme may be defined across the system bandwidth, with the exception that the portion of the system bandwidth within the second frequency range may use a different scrambling scheme. Each of these approaches may provide for descrambling common control information without UE 205 knowing the system bandwidth or raster offset yet.

In some aspects, the scrambling scheme may use scrambling sequences to scramble the reference signals associated with the second frequency range that are different from a scrambling sequence used to scramble other reference signals associated with frequencies outside of the second frequency range. For example, the scrambling sequence used for reference signals within the second frequency range may be different (e.g., use a different range, use different lengths of scrambling codes, etc.).

In some aspects, the scrambling scheme may be a mid-tone scrambling sequence that begins at the center frequency of the second frequency range and proceeds outward (e.g., upward and downward) from the center frequency through the system bandwidth. Thus, UE 205 may know a priori which scrambling sequence is used on the reference signals used to decode the common control information.

Certain UEs whose bandwidth capability equals or is less than the bandwidth of the first frequency range may be referred to as minimum bandwidth UEs. The described techniques support the UE processing of the common control information without knowing the system bandwidth or raster offset, e.g., support handling of these minimum bandwidth UEs.

For UEs with larger bandwidth capabilities, the downlink SIB broadcast messages may be transmitted over a wider bandwidth, which includes the above-mentioned minimum bandwidth. This may apply to every beam on which the downlink SIB messages are sent, e.g., both in the beam-sweeping case and in the case of a fixed beam identified via the UE's pre-random access channel (RACH) transmission (discussed with reference to FIGS. 4 and 5). The minimum bandwidth UEs may receive just the portions of the downlink SIB messages that lie within their bandwidth capability. However, the SIB messages may be repeated multiple times. By ensuring that different subsets of the encoded bits are modulated into the minimum bandwidth subset at different repetitions, this may support lower bandwidth UEs to also read these downlink SIB messages. The described techniques may thus support minimum bandwidth UEs by using different redundancy versions at different repetitions. In aspects, minimum bandwidth UEs may be supported by using the same redundancy version with a cyclic shift of blocks of tones applied after modulation, e.g., so that a different set of modulation symbols are mapped into the minimum bandwidth at each repetition.

Thus, in some aspects a cyclic shift pattern may be used to convey the common control information. For example, a cyclic shift pattern may be selected for block(s) of tones used to convey the common control information. Such an approach may ensure that minimum bandwidth UEs receive the common control information.

While the above techniques may work for OFDM based systems, concerns may arise for DFT-s-OFDM based systems due to DFT-spreading across the system bandwidth, which makes it difficult for a UE to receive information over a subset of that bandwidth. The described techniques may be extended to the case of multi-cluster DFT-s-OFDM transmissions, where each cluster has its own DFT-spreading. In this case the clusters could define the blocks of tones to be cyclically shifted. Thus, in some aspects a set of clusters for a multi-cluster DFT-s-OFDM scheme may be selected. Each cluster in the multi-cluster DFT-s-OFDM scheme may be associated with a different DFT spreading function. The set of clusters may identify the one or more blocks of tones. Thus, in some aspects, the common control information may be transmitted according to the cyclic shift pattern and/or according to the set of clusters.

At 240, UE 205 may optionally identify a downlink grant for a SIB. The downlink grant may be conveyed or otherwise carried on a PDCCH. The downlink grant may provide a pointer to resources allocated for transmission of a SIB, e.g., resources associated with a PDSCH.

At 245, the network entity 210 may optionally transmit a SIB, e.g., via a base station, to the UE 205. The SIB may be transmitted via PDSCH, in some aspects. Additionally or alternatively, the SIB may be transmitted via PDCCH. At 250, the UE 205 may optionally identify a system bandwidth and a raster offset based at least in part on the SIB. For example, the SIB may convey the system bandwidth and raster offset and/or may include a pointer to a table that can be used to identify the system bandwidth and raster offset.

Some wireless communications systems may support multiple SIB types. For example, a first SIB type (e.g., which may in some cases be referred to as remaining minimum system information (RMSI)) may convey the minimum information (e.g., in addition to system information conveyed via a master information block (MIB)) which a UE 115 needs before it can participate in a RACH procedure. A second SIB type (e.g., other system information (OSI)) may carry complementary information that is not required to participate in a RACH procedure. OSI may be carried via SIB or may be conveyed via radio resource control (RRC) signaling. By way of example, the RMSI may be carried over the same frequency range as the synchronization signals (e.g., such that bandwidth-limited UEs 115 may decode the RMSI and synchronization information). Accordingly, the first frequency range (e.g., associated with the synchronization information) may in some cases be the same as the second frequency range, as described further below.

Figure 3:
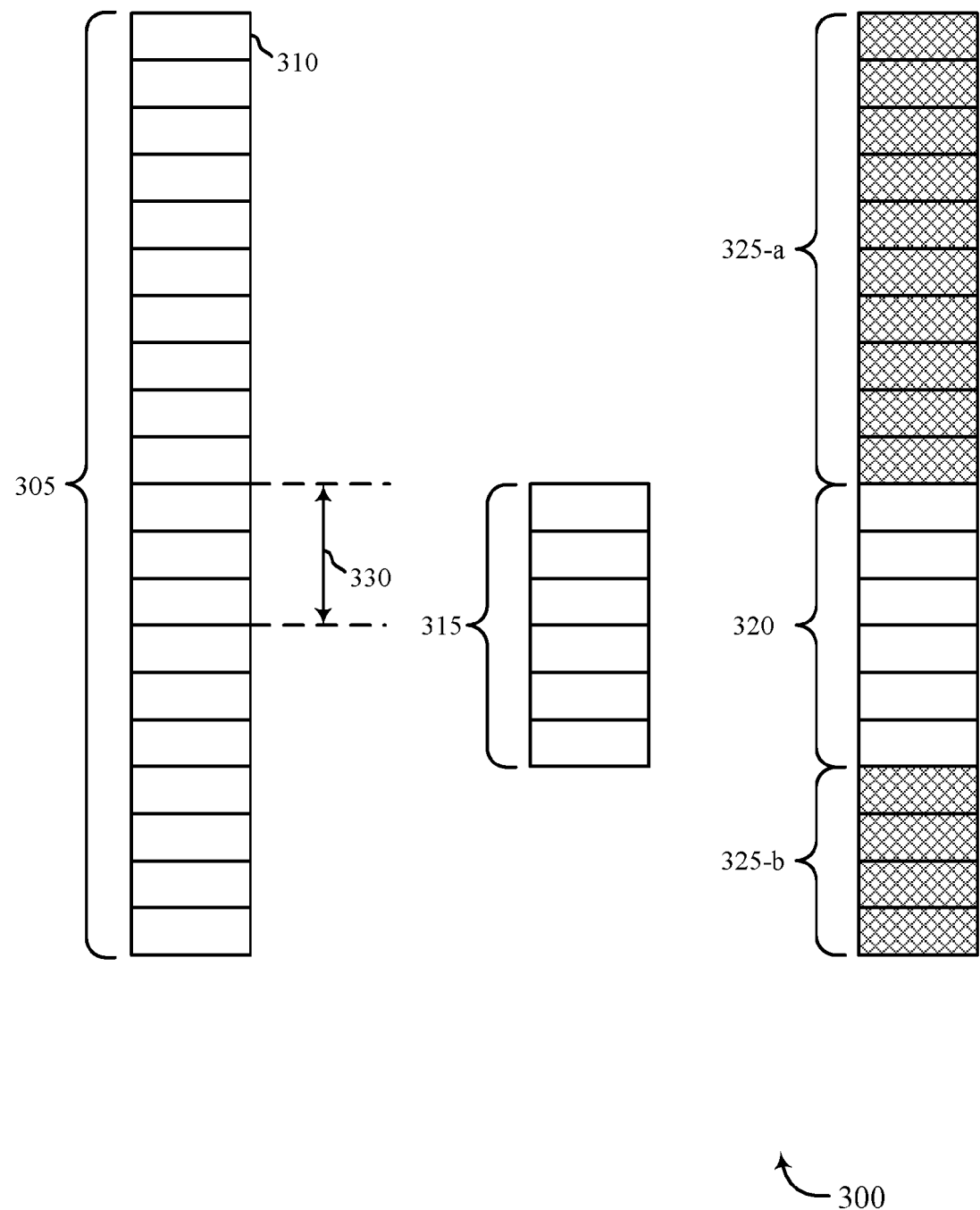
FIG. 3 illustrates an example of a bandwidth diagram that supports system information block transmission in accordance with aspects of the present disclosure.

FIG. 3 illustrates an example of a bandwidth diagram 300 for system information block transmission. Diagram 300 may implement one or more aspects of wireless communications system 100 and/or process flow 200 of FIGS. 1 and 2. Aspects of diagram 300 may be implemented by a network entity and/or a UE, which may be examples of the corresponding devices described above.

Diagram 300 may include an example of a system bandwidth 305 that includes a plurality of frequencies 310, which may also be referred to as tones, bins, channels, hops, etc. Although twenty frequencies 310 are illustrated in FIG. 3, it is to be understood that the system bandwidth 305 is not limited to twenty frequencies 310 and may, instead, include fewer or more frequencies 310.

Diagram 300 may include a first frequency range 315, a second frequency range 320, and a set of frequencies 325. The first frequency range 315 may be associated with transmission of synchronization information, as is discussed above. The first frequency range 315 may include a subset off frequencies 310 from the system bandwidth 305. Diagram 300 also illustrates a raster offset 330 which may be the offset between the center frequency of the system bandwidth 305 and the center frequency within the first frequency range 315.

The second frequency range 320 may be associated with transmission of common control information. The second frequency range 320 may be based on the first frequency range 315. In the example of FIG. 3, the second frequency range 320 occupies the same subset of frequencies as the first frequency range 315. In other examples, the second frequency range may be a function of the first frequency range 315. For example, the second frequency range 320 may be offset above or below the first frequency range 315 by a predetermined distance or number of frequencies 310. In another example, the second frequency range 320 may be a predetermined distance above or below the first frequency range 315. Other techniques may also be used such that the second frequency range 320 is based on or otherwise a function of the first frequency range 315.

Generally, the set of frequencies 325 (identified as frequencies 325-a and 325-b) generally illustrate the frequencies 310 within the system bandwidth that are outside of the second frequency range 320, e.g., used for channelization of downlink and/or uplink transmissions (e.g., transmissions using PDSCH).

Figure 4:
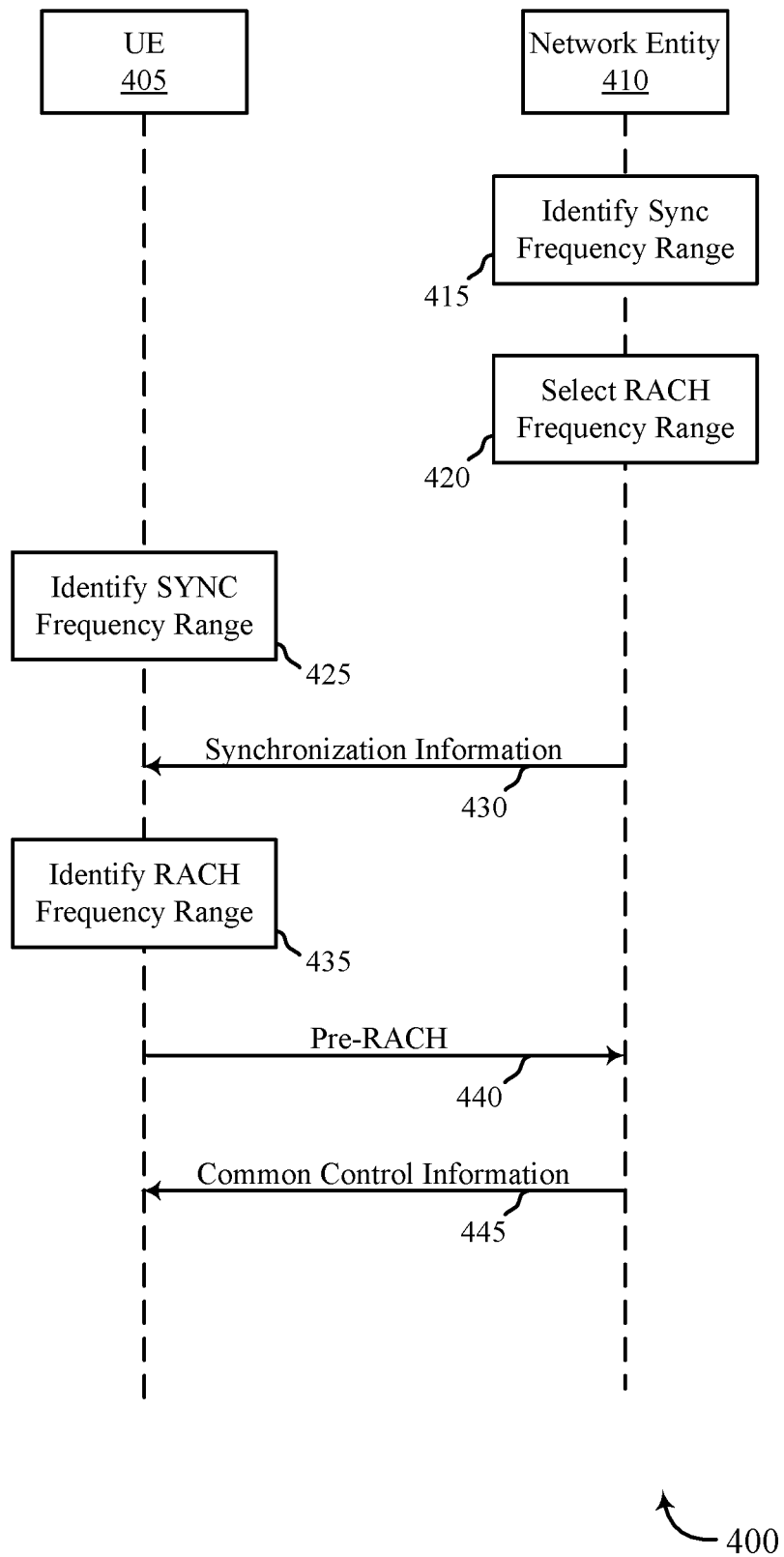
FIG. 4 illustrates an example of a process flow that supports system information block transmission in accordance with aspects of the present disclosure.

FIG. 4 illustrates an example of a process flow 400 for system information block transmission. Process flow 400 may implement one or more aspects of wireless communication system 100, a process flow 200, and/or a diagram 300 of FIGS. 1 through 3. Process flow 400 may include a UE 405 and a network entity 410, which may be examples of the corresponding devices discussed with reference to FIGS. 1 through 3.

Broadly, process flow 400 may implement aspects of the described techniques that also include a RACH procedure. For example, even with fixed parameters that avoid the need for scheduling the SIBs, the SIB messages themselves may still be broadcast. In particular for mmW systems, broadcasting SIB messages may mean beam-sweeping the broadcast signals and/or using very low code-rates. Such constraints may be avoided by allowing the UE 405 to go through a RACH procedure after decoding as few SIB messages as possible. UE 405 may then receive the remaining system information via unicast signalling (e.g., via RRC signalling) instead. In particular, the minimum information needed for RACH may be contained in the synchronization information transmissions (e.g., the first frequency range). However, RACH procedures conventionally use knowledge of the system bandwidth and the raster offset in order to distribute the RACH messages over the system bandwidth. To enable UE 405 to perform a RACH procedure without this knowledge, the bandwidth of the RACH messages may be restricted to be related to that of first frequency range, similar to the feature discussed above with respect to the second frequency range.

At 415, the network entity 410 may identify the synchronization frequency range of a system bandwidth used for transmission of synchronization information. The synchronization frequency range may correspond to the first frequency range discussed above.

At 420, the network entity 410 may select the RACH frequency range of the system bandwidth that is used for the transmission of the RACH messages. The RACH frequency range may correspond to a third frequency range, in some aspects. The RACH frequency range may be a function of the synchronization frequency range, e.g., may be the same as the synchronization frequency range or may be based on (or a function of) the synchronization frequency range.

At 425, the UE 405 may identify the synchronization frequency range that is used for transmission of synchronization information. As discussed above, the synchronization frequency range may correspond to the first frequency range discussed above and may be preconfigured. Therefore, UE 405 may know the synchronization frequency range a priori.

At 430, the network entity 410 may transmit (and UE 405 may receive) the synchronization information, e.g., via a base station.

At 435, the UE 405 may identify the RACH frequency range that is used for the transmission of RACH messages. The RACH frequency range may be based on the synchronization frequency range, e.g., may be the same frequency range, may be a function of the synchronization frequency range, and the like. Generally, UE 405 may have preconfigured information associated with the relationship between the synchronization frequency range and the RACH frequency range, e.g., information that may be used to derive the RACH frequency range based at least in part on the synchronization frequency range.

At 440, UE 405 may transmit a pre-RACH message to the network entity (e.g., via a base station). The pre-RACH message may be transmitted at a frequency within the RACH frequency range. In some aspects, the pre-RACH message may include information associated with the location of the UE 405 and/or directional information for UE 405 with respect to the base station.

At 445, network entity 410 (via a base station) may transmit, responsive to the pre-RACH message, the remaining system information to the UE 405. The remaining system information (e.g., and/or common control information) may be transmitted in a beamforming direction that is indicated in the pre-RACH message.

Figure 5:
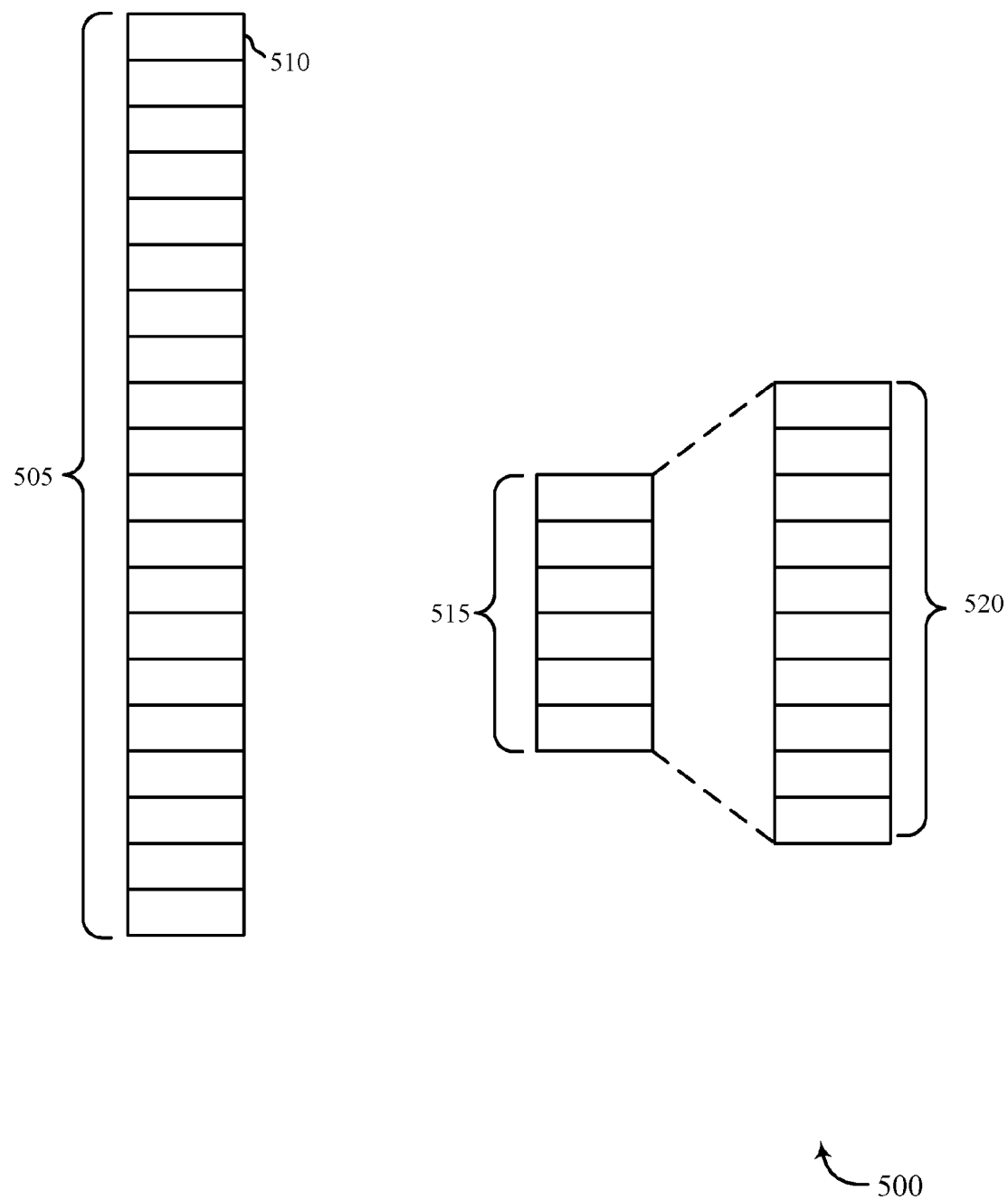
FIG. 5 illustrates an example of a bandwidth diagram that supports system information block transmission in accordance with aspects of the present disclosure.

FIG. 5 illustrates an example of a bandwidth diagram 500 for system information block transmission. Diagram 500 may implement one or more aspects of wireless communications system 100 and/or process flows 200 or 400 of FIGS. 1, 2, and 4. Aspects of diagram 500 may be implemented by a network entity and/or a UE, which may be examples of the corresponding devices described above.

Diagram 500 may include an example of a system bandwidth 505 that includes a plurality of frequencies 510, which may also be referred to as tones, or bins, or channels, etc. Although 20 frequencies 510 are illustrated in FIG. 5, it is to be understood that the system bandwidth 505 is not limited to 20 frequencies 510 and may, instead, include fewer or more frequencies 510.

Diagram 500 may include a first frequency range 515 (also referred to as a synchronization frequency range) and a second frequency range 520 (also referred to as a RACH frequency range). The first frequency range 515 may include a subset of frequencies 510 from the set of available frequencies that make up the system bandwidth 505. The second frequency range 520 may be associated with transmission of RACH messages as a part of a RACH procedure. The second frequency range 520 may be based on the first frequency range 515. In the example of FIG. 5, the second frequency range 520 occupies more frequencies 510 than the frequencies of the first frequency range 515. In other examples, the second frequency range 520 may be a function of the first frequency range 515. For example, the second frequency range 520 may be offset above or below the first frequency range 515 by a predetermined distance or number of frequencies 510. In another example, the second frequency range 520 may be a predetermined amount of frequencies larger or smaller than the first frequency range 515. Other techniques may also be used such that the second frequency range 520 is based on or otherwise a function of the first frequency range 515.

Figure 6:
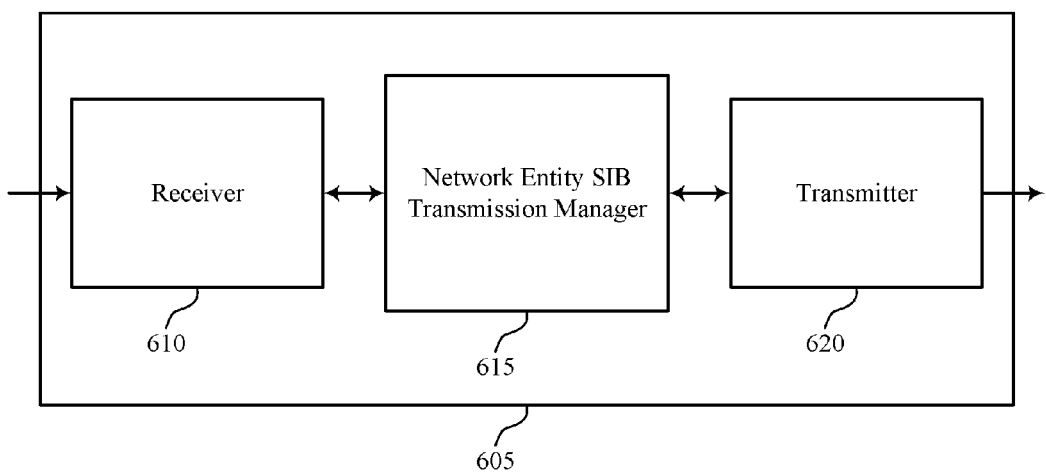
FIGS. 6 through 8 show block diagrams of a device that supports system information block transmission in accordance with aspects of the present disclosure.

FIG. 6 shows a block diagram 600 of a wireless device 605 that supports system information block transmission in accordance with various aspects of the present disclosure. Wireless device 605 may be an example of aspects of a network entity, as described with reference to FIGS. 1 through 5. Wireless device 605 may include receiver 610, network entity SIB transmission manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to system information block transmission, etc.). Information may be passed on to other components of the device. The receiver 610 may be an example of aspects of the transceiver 935 described with reference to FIG. 9.

Network entity SIB transmission manager 615 may be an example of aspects of the network entity SIB transmission manager 915 described with reference to FIG. 9. Network entity SIB transmission manager 615 may identify a first frequency range of a system bandwidth used for transmission of synchronization information, select a second frequency range of the system bandwidth used for transmission of common control information, and transmit the common control information within the selected second frequency range of the system bandwidth. In some cases, the second frequency range of the system bandwidth may be a function of the first frequency range of the system bandwidth, and the first frequency range and the second frequency range may each be less than the system bandwidth.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
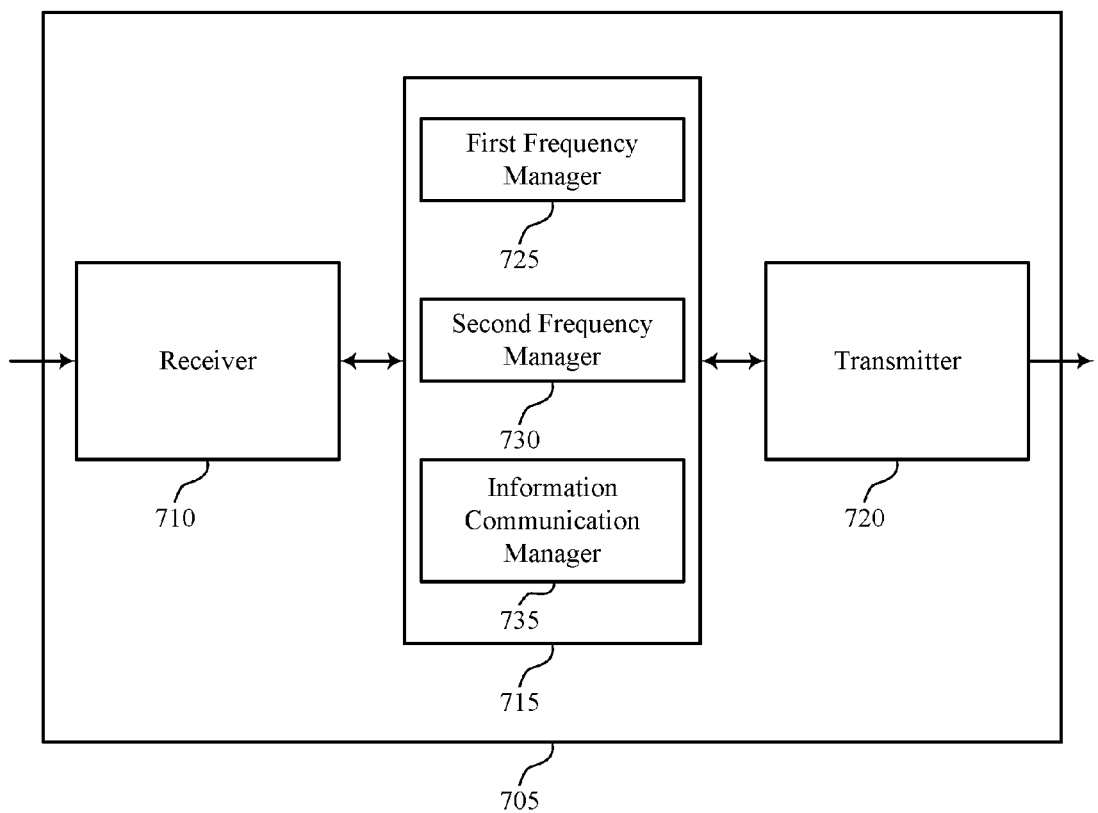

FIG. 7 shows a block diagram 700 of a wireless device 705 that supports system information block transmission in accordance with various aspects of the present disclosure. Wireless device 705 may be an example of aspects of a wireless device 605 or a network entity, as described with reference to FIGS. 1 through 6. Wireless device 705 may include receiver 710, network entity SIB transmission manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to system information block transmission, etc.). Information may be passed on to other components of the device. The receiver 710 may be an example of aspects of the transceiver 935 described with reference to FIG. 9.

Network entity SIB transmission manager 715 may be an example of aspects of the corresponding components described with reference to FIGS. 6, 8, and 9. Network entity SIB transmission manager 715 may also include first frequency manager 725, second frequency manager 730, and information communication manager 735.

First frequency manager 725 may identify a first frequency range of a system bandwidth used for transmission of synchronization information and encode the synchronization information to convey information associated with a SIB, where the information is a function of the synchronization information. In some cases, the synchronization information includes at least one of a PSS, a SSS, a broadcast signal, a PBCH, or combinations thereof.

Second frequency manager 730 may select a second frequency range of the system bandwidth used for transmission of common control information, the second frequency range of the system bandwidth being a function of the first frequency range of the system bandwidth, and the first frequency range and the second frequency range each being less than the system bandwidth.

Information communication manager 735 may transmit the common control information and a reference signal within the selected second frequency range of the system bandwidth, configure the common control information to convey an indication of a SIB grant, and transmit the SIB in the common control information using a fixed frequency allocation, a known modulation order, a known scrambling order, or a combination thereof. In some cases, the common control information includes a downlink grant received on a PDCCH, the downlink grant providing a resource allocation for a SIB, the SIB indicating the system bandwidth and a raster offset. In some cases, the common control information includes a SIB, the SIB indicating the system bandwidth and a raster offset. Information control manager 735 may select a scrambling scheme for the reference signal used to decode the common control information.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
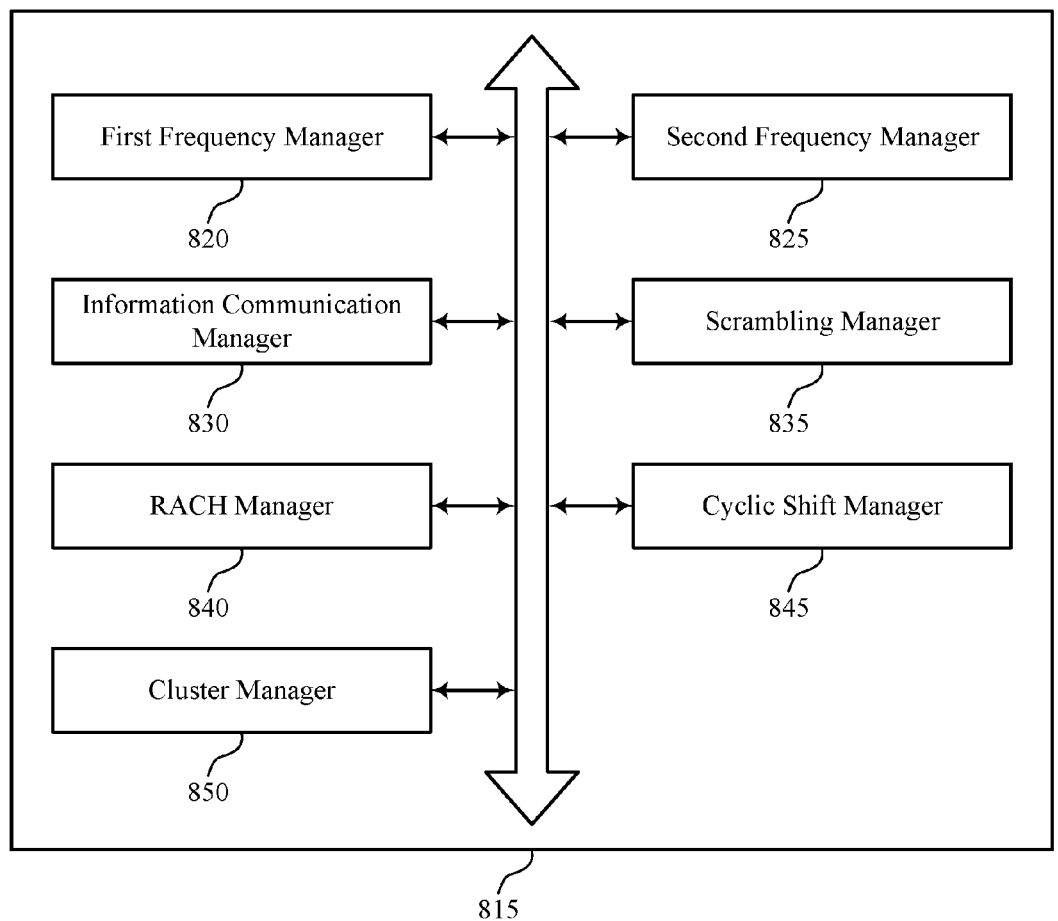

FIG. 8 shows a block diagram 800 of a network entity SIB transmission manager 815 that supports system information block transmission in accordance with various aspects of the present disclosure. The network entity SIB transmission manager 815 may be an example of aspects of a network entity SIB transmission manager 615, a network entity SIB transmission manager 715, or a network entity SIB transmission manager 915 described with reference to FIGS. 6, 7, and 9. The network entity SIB transmission manager 815 may include first frequency manager 820, second frequency manager 825, information communication manager 830, scrambling manager 835, RACH manager 840, cyclic shift manager 845, and cluster manager 850. Each of these modules may communicate, directly or indirectly, with one another (e.g., via one or more buses).

First frequency manager 820 may identify a first frequency range of a system bandwidth used for transmission of synchronization information and encode the synchronization information to convey information associated with a SIB, where the information is a function of the synchronization information. In some cases, the synchronization information includes at least one of a PSS, a SSS, a broadcast signal, or combinations thereof.

Second frequency manager 825 may select a second frequency range of the system bandwidth used for transmission of common control information, the second frequency range of the system bandwidth being a function of the first frequency range of the system bandwidth, and the first frequency range and the second frequency range each being less than the system bandwidth.

Information communication manager 830 may transmit the common control information and a reference signal within the selected second frequency range of the system bandwidth, configure the common control information to convey an indication of a SIB grant, and transmit the SIB in the common control information using a fixed frequency allocation, a known modulation order, a known scrambling order, or combinations thereof. In some cases, the common control information includes a downlink grant received on a PDCCH, the downlink grant providing a resource allocation for a SIB, the SIB indicating the system bandwidth and a raster offset. In some cases, the common control information includes a SIB, the SIB indicating the system bandwidth and a raster offset.

Scrambling manager 835 may select a scrambling scheme for the reference signal used to decode the common control information, the scrambling scheme being a function of the first frequency range of the system bandwidth, and the common control information including a downlink grant. In some cases, the scrambling scheme includes use of a scrambling sequence to scramble the reference signals associated with the second frequency range that is different from a system scrambling sequence to scramble other reference signals associated with frequencies outside of the second frequency range. In some cases, the scrambling scheme includes use of a mid-tone scrambling sequence that begins at a center frequency of the second frequency range and proceeds outward through the system bandwidth.

RACH manager 840 may select a third frequency range of the system bandwidth used for transmissions of one or more messages associated with a RACH procedure, the third frequency range being a function of the first frequency range of the system bandwidth, receive a pre-RACH transmission from a UE at a frequency within the third frequency range, and transmit, responsive to receiving the pre-RACH transmission, the common control information to the UE. In some cases, the common control information is transmitted according to a beamforming direction that is indicated by the pre-RACH transmission.

Cyclic shift manager 845 may select a cyclic shift pattern for one or more blocks of tones conveying the common control information and transmit the common control information according to the cyclic shift pattern.

Cluster manager 850 may select a set of clusters for a multi-cluster DFT-s-OFDM scheme, where each cluster in the multi-cluster DFT-s-OFDM scheme is associated with a different DFT spreading function, where the set of clusters identify the one or more blocks of tones and transmit the common control information according to the set of clusters.

Figure 9:
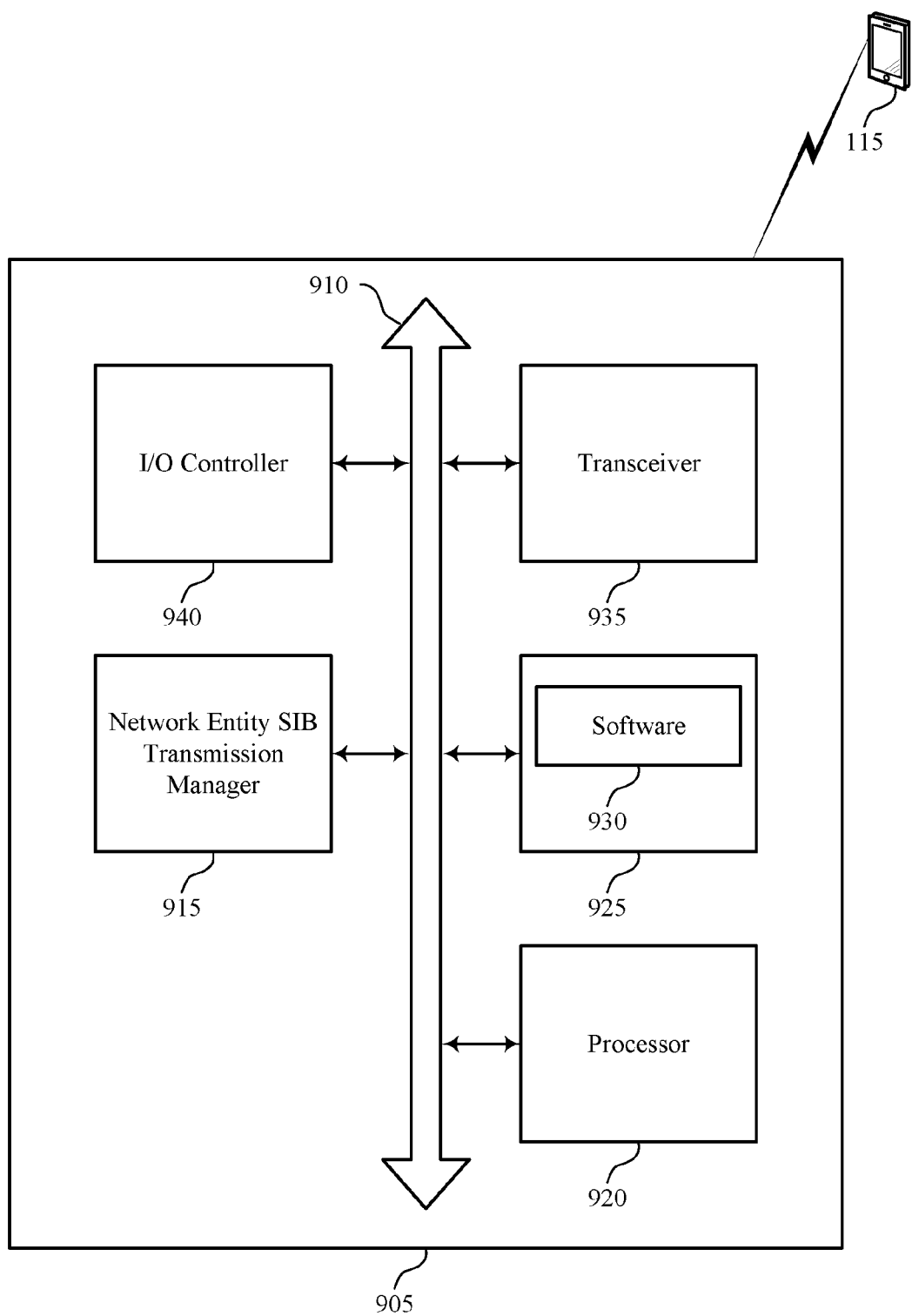
FIG. 9 illustrates a block diagram of a system including a network entity that supports system information block transmission in accordance with aspects of the present disclosure.

FIG. 9 shows a diagram of a system 900 including a device 905 that supports system information block transmission in accordance with various aspects of the present disclosure. Device 905 may be an example of or include the components of wireless device 605, wireless device 705, or a network entity, as described above, e.g., with reference to FIGS. 1 through 7. Device 905 may include components for bi-directional voice and data communications including components for transmitting and receiving communications, including network entity SIB transmission manager 915, processor 920, memory 925, software 930, transceiver 935, and I/O controller 940. These components may be in electronic communication via one or more buses (e.g., bus 910).

Processor 920 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting system information block transmission).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support system information block transmission. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above (e.g., with one or more UEs 115). For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system.

Figure 10:
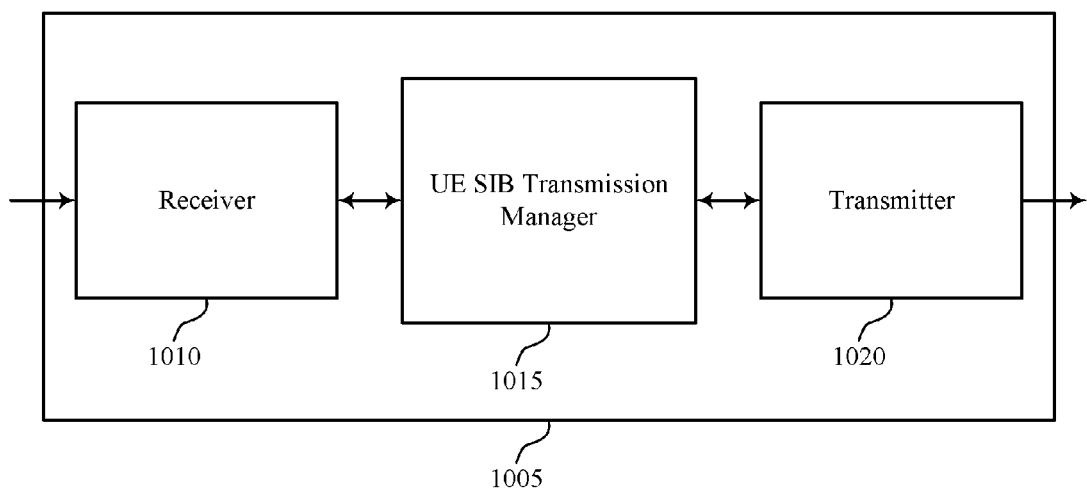
FIGS. 10 through 12 show block diagrams of a device that supports system information block transmission in accordance with aspects of the present disclosure.

FIG. 10 shows a block diagram 1000 of a wireless device 1005 that supports system information block transmission in accordance with various aspects of the present disclosure. Wireless device 1005 may be an example of aspects of a UE 115 as described with reference to FIGS. 1 through 5. Wireless device 1005 may include receiver 1010, UE SIB transmission manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to system information block transmission, etc.). Information may be passed on to other components of the device. The receiver 1010 may be an example of aspects of the transceiver 1335 described with reference to FIG. 13.

UE SIB transmission manager 1015 may be an example of aspects of the UE SIB transmission manager 1315 described with reference to FIG. 13. UE SIB transmission manager 1015 may identify a first frequency range of a system bandwidth used for transmission of a synchronization information, identify a second frequency range of a system bandwidth used for transmission of common control information, and receive the common control information and a reference signal within the identified second frequency range of the system bandwidth. In some cases, the second frequency range of the system bandwidth is a function of the first frequency range of the system bandwidth, and the first frequency range and the second frequency range are each less than the system bandwidth. In some cases, the scrambling scheme is a function of the first frequency range of the system bandwidth.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
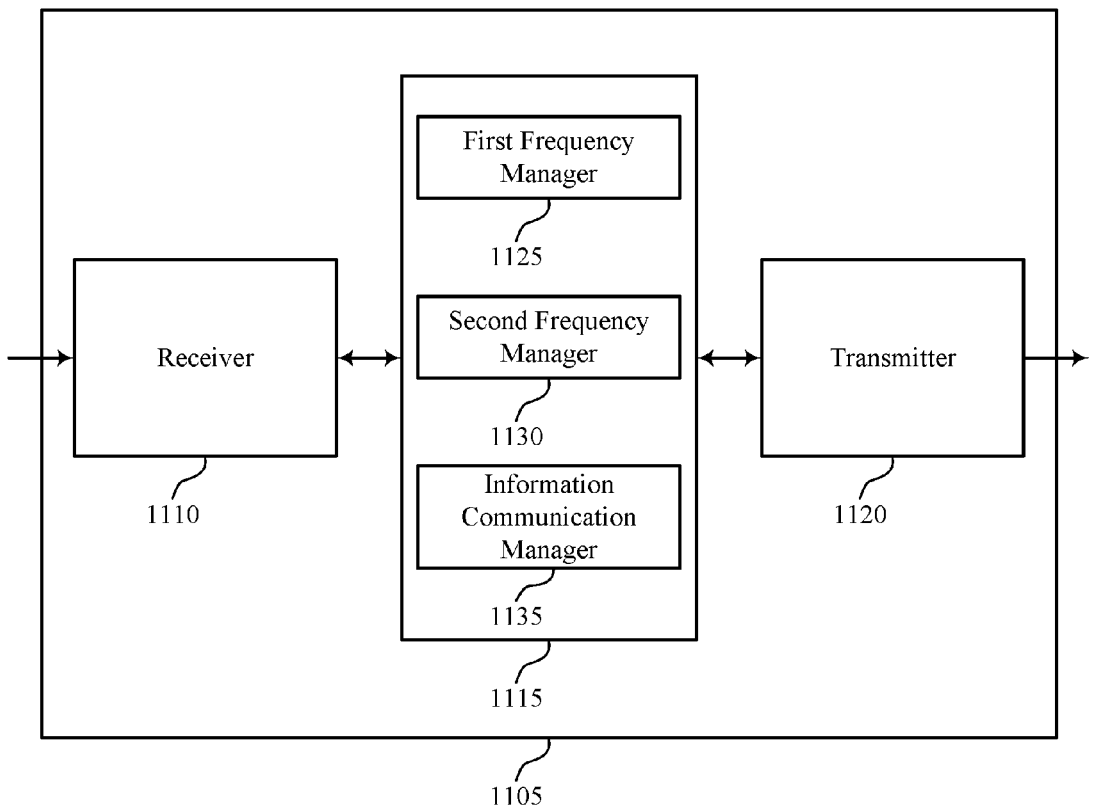

FIG. 11 shows a block diagram 1100 of a wireless device 1105 that supports system information block transmission in accordance with various aspects of the present disclosure. Wireless device 1105 may be an example of aspects of a wireless device 1005 or a UE 115 as described with reference to FIGS. 1 through 5 and 10. Wireless device 1105 may include receiver 1110, UE SIB transmission manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to system information block transmission, etc.). Information may be passed on to other components of the device. The receiver 1110 may be an example of aspects of the transceiver 1335 described with reference to FIG. 13.

UE SIB transmission manager 1115 may be an example of aspects of the corresponding component described with reference to FIGS. 10, 12, and 13. UE SIB transmission manager 1115 may also include first frequency manager 1125, second frequency manager 1130, and information communication manager 1135. First frequency manager 1125 may identify a first frequency range of a system bandwidth used for transmission of a synchronization information. Second frequency manager 1130 may identify a second frequency range of a system bandwidth used for transmission of common control information, the second frequency range of the system bandwidth being a function of the first frequency range of the system bandwidth, and the first frequency range and the second frequency range each being less than the system bandwidth.

Information communication manager 1135 may receive the common control information and a reference signal within the identified second frequency range of the system bandwidth. Information communication manager 1135 may descramble the reference signal used to decode the common control information according to a scrambling scheme.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
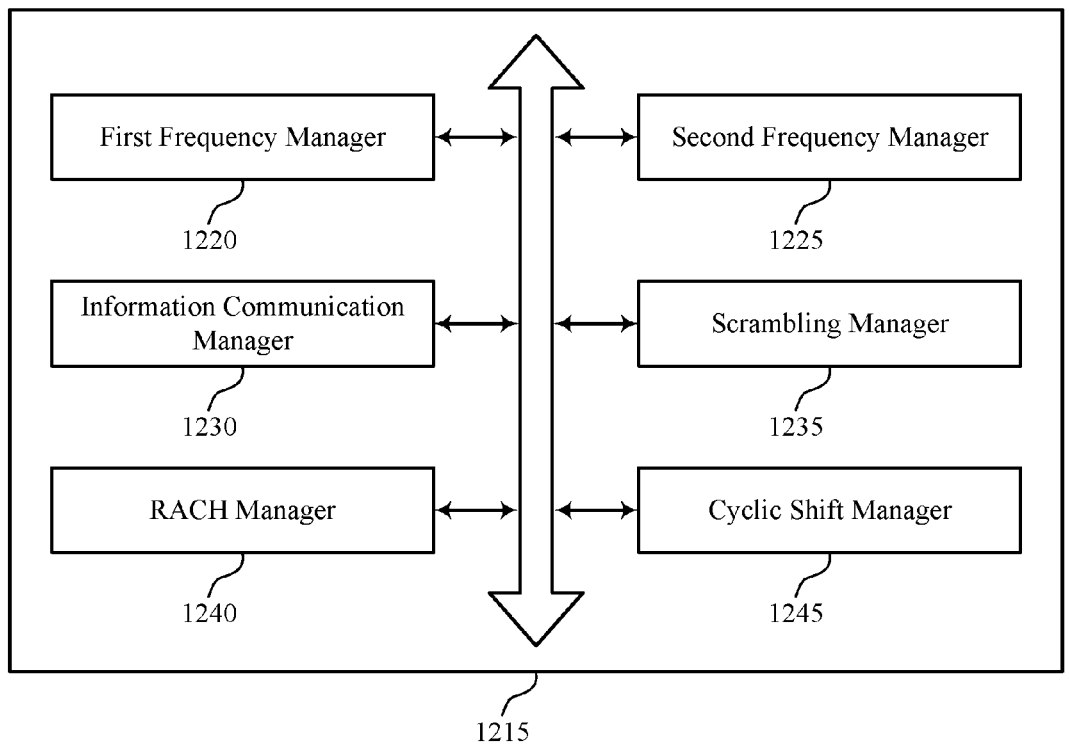

FIG. 12 shows a block diagram 1200 of a UE SIB transmission manager 1215 that supports system information block transmission in accordance with various aspects of the present disclosure. The UE SIB transmission manager 1215 may be an example of aspects of a UE SIB transmission manager 1315 described with reference to FIGS. 10, 11, and 13. The UE SIB transmission manager 1215 may include first frequency manager 1220, second frequency manager 1225, information communication manager 1230, scrambling manager 1235, RACH manager 1240, and cyclic shift manager 1245. Each of these modules may communicate, directly or indirectly, with one another (e.g., via one or more buses).

First frequency manager 1220 may identify a first frequency range of a system bandwidth used for transmission of a synchronization information.

Second frequency manager 1225 may identify a second frequency range of a system bandwidth used for transmission of common control information, the second frequency range of the system bandwidth being a function of the first frequency range of the system bandwidth, and the first frequency range and the second frequency range each being less than the system bandwidth.

Information communication manager 1230 may receive the common control information and a reference signal within the identified second frequency range of the system bandwidth.

Scrambling manager 1235 may descramble a reference signal used to decode the common control information according to a scrambling scheme, the scrambling scheme being a function of the first frequency range of the system bandwidth, and the common control information including a downlink grant.

RACH manager 1240 may identify a third frequency range of the system bandwidth used for transmission of one or more messages associated with a RACH procedure, the third frequency range being a function of the first frequency range of the system bandwidth, transmit a pre-RACH transmission to a base station at a frequency within the third frequency range, and receive, responsive to the transmission of the pre-RACH transmission, the common control information from the base station. In some cases, the common control information is received according to a beamforming direction that is indicated by the pre-RACH transmission.

Cyclic shift manager 1245 may receive the common control information according to a cyclic shift pattern, where the cyclic shift pattern includes one or more blocks of tones conveying the common control information.

Figure 13:
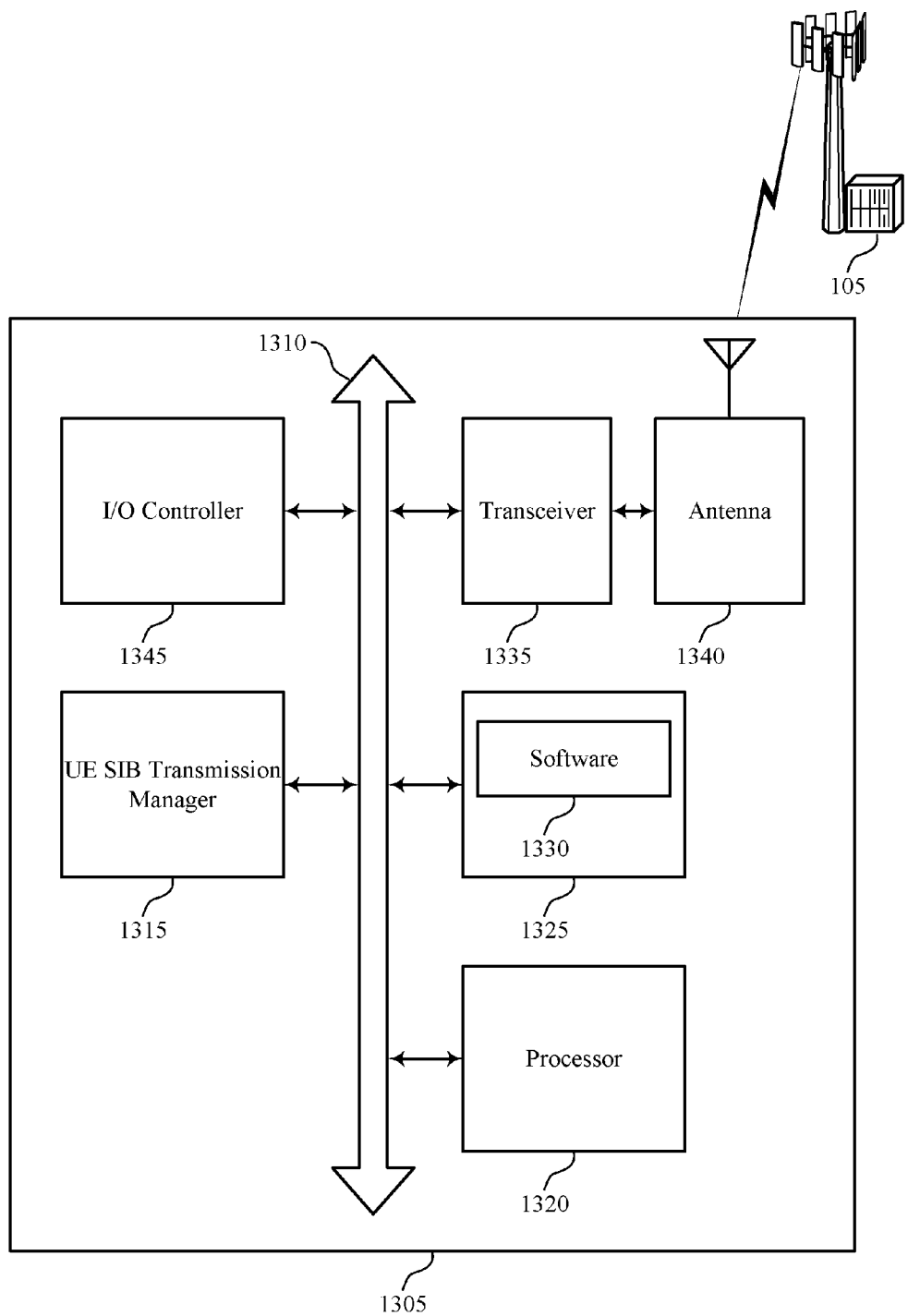
FIG. 13 illustrates a block diagram of a system including a user equipment that supports system information block transmission in accordance with aspects of the present disclosure.

FIG. 13 shows a diagram of a system 1300 including a device 1305 that supports system information block transmission in accordance with various aspects of the present disclosure. Device 1305 may be an example of or include the components of UE 115 as described above, e.g., with reference to FIGS. 1 through 5. Device 1305 may include components for bi-directional voice and data communications including components for transmitting and receiving communications, including UE SIB transmission manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting system information block transmission).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support system information block transmission. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system.

Figure 14:
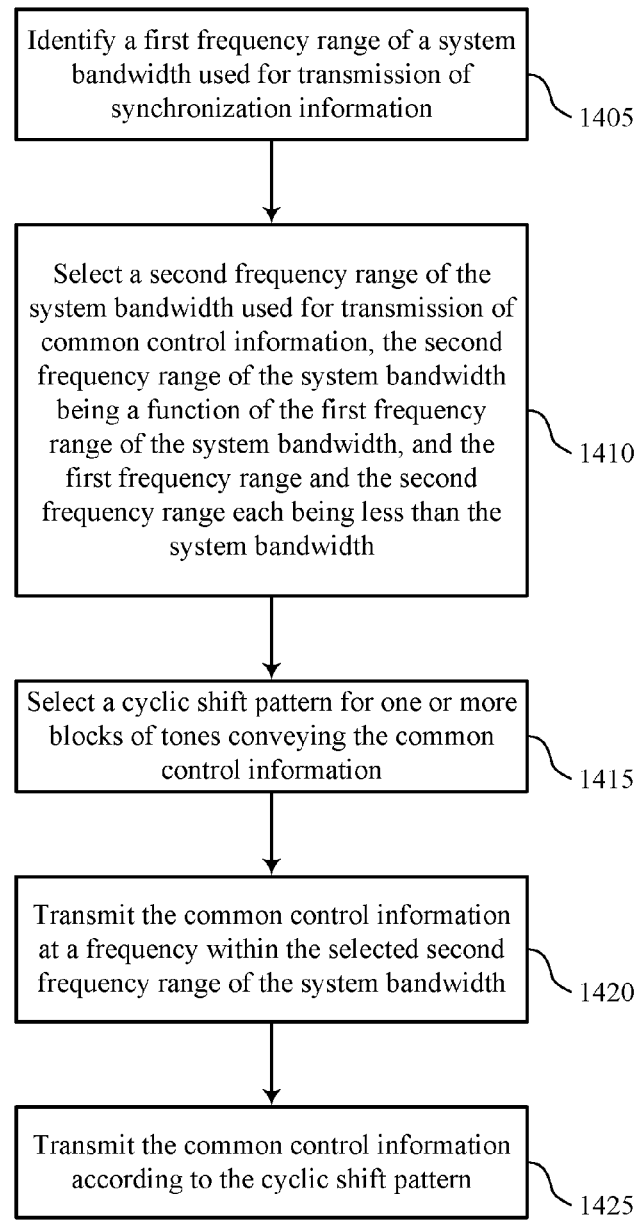
FIGS. 14 through 17 illustrate methods for system information block transmission in accordance with aspects of the present disclosure.

FIG. 14 shows a flowchart illustrating a method 1400 for system information block transmission in accordance with various aspects of the present disclosure. The operations of method 1400 may be implemented by a network entity or its components as described herein. For example, the operations of method 1400 may be performed by a network entity SIB transmission manager as described with reference to FIGS. 6 through 9. In some examples, a network entity may execute a set of codes to control the functional elements of the device to perform the functions described below. Additionally or alternatively, the network entity may perform aspects the functions described below using special-purpose hardware.

At 1405 the network entity may identify a first frequency range of a system bandwidth used for transmission of synchronization information. The operations of 1405 may be performed according to the methods described with reference to FIGS. 1 through 5. In certain examples, aspects of the operations of 1405 may be performed by a first frequency manager as described with reference to FIGS. 6 through 9.

At 1410 the network entity may select a second frequency range of the system bandwidth used for transmission of common control information, the second frequency range of the system bandwidth being a function of the first frequency range of the system bandwidth, and the first frequency range and the second frequency range each being less than the system bandwidth. The operations of 1410 may be performed according to the methods described with reference to FIGS. 1 through 5. In certain examples, aspects of the operations of 1410 may be performed by a second frequency manager as described with reference to FIGS. 6 through 9.

At 1415 the network entity may select a cyclic shift pattern for one or more blocks of tones conveying the common control information. The operations of 1415 may be performed according to the methods described with reference to FIGS. 1 through 5. In certain examples, aspects of the operations of 1415 may be performed by a cyclic shift manager as described with reference to FIGS. 6 through 9.

At 1420 the network entity may transmit the common control information at a frequency within the selected second frequency range of the system bandwidth. The operations of 1420 may be performed according to the methods described with reference to FIGS. 1 through 5. In certain examples, aspects of the operations of 1420 may be performed by an information communication manager as described with reference to FIGS. 6 through 9.

At 1425 the network entity may transmit the common control information according to the cyclic shift pattern. The operations of 1425 may be performed according to the methods described with reference to FIGS. 1 through 5. In certain examples, aspects of the operations of 1425 may be performed by a cyclic shift manager as described with reference to FIGS. 6 through 9.

Figure 15:
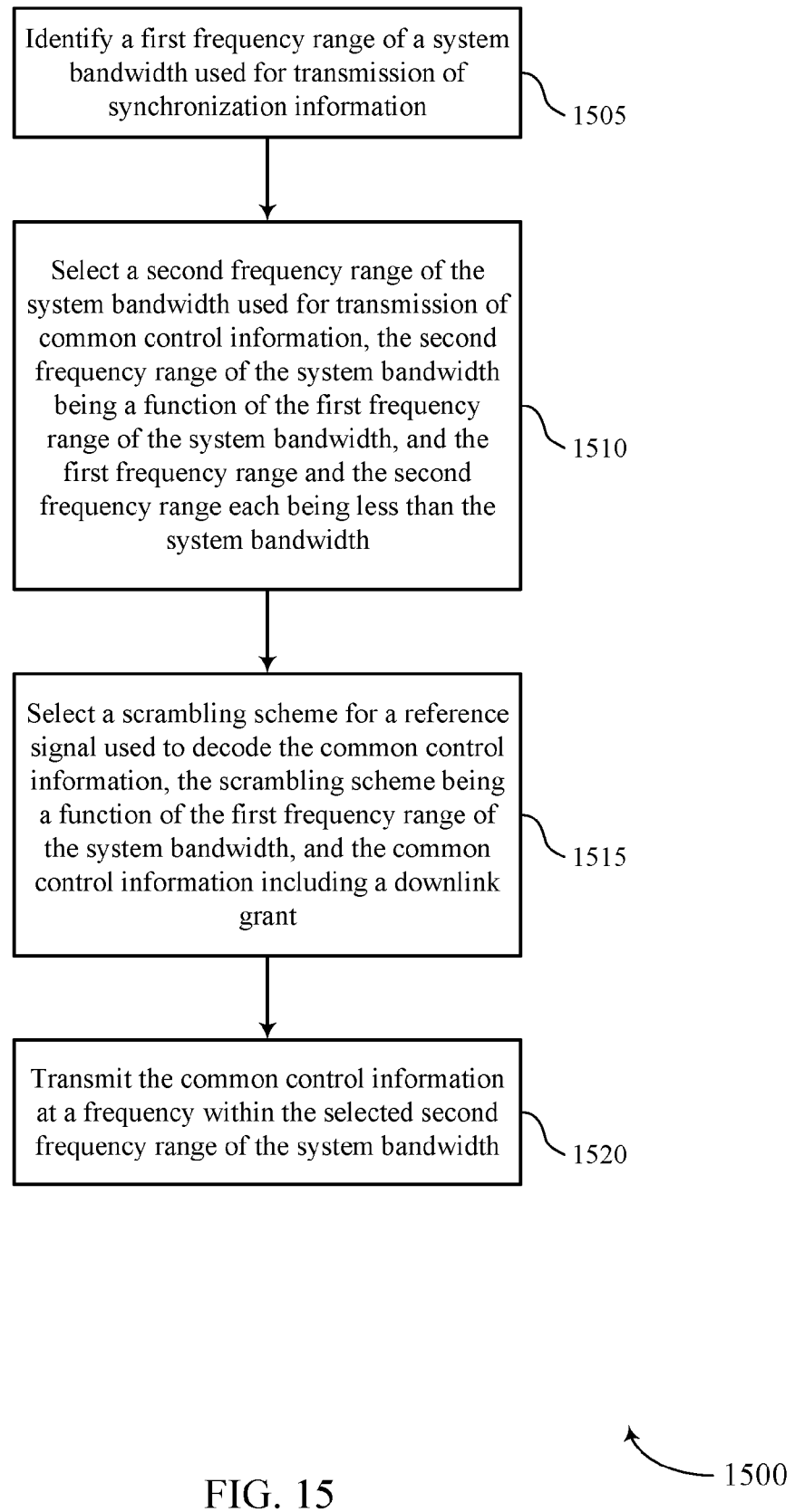

FIG. 15 shows a flowchart illustrating a method 1500 for system information block transmission in accordance with various aspects of the present disclosure. The operations of method 1500 may be implemented by a network entity or its components as described herein. For example, the operations of method 1500 may be performed by a network entity SIB transmission manager as described with reference to FIGS. 6 through 9. In some examples, a network entity may execute a set of codes to control the functional elements of the device to perform the functions described below. Additionally or alternatively, the network entity may perform aspects the functions described below using special-purpose hardware.

At 1505 the network entity may identify a first frequency range of a system bandwidth used for transmission of synchronization information. The operations of 1505 may be performed according to the methods described with reference to FIGS. 1 through 5. In certain examples, aspects of the operations of 1505 may be performed by a first frequency manager as described with reference to FIGS. 6 through 9.

At 1510 the network entity may select a second frequency range of the system bandwidth used for transmission of common control information, the second frequency range of the system bandwidth being a function of the first frequency range of the system bandwidth, and the first frequency range and the second frequency range each being less than the system bandwidth. The operations of 1510 may be performed according to the methods described with reference to FIGS. 1 through 5. In certain examples, aspects of the operations of 1510 may be performed by a second frequency manager as described with reference to FIGS. 6 through 9.

At 1515 the network entity may select a scrambling scheme for a reference signal used to decode the common control information, the scrambling scheme being a function of the first frequency range of the system bandwidth, and the common control information comprising a downlink grant. The operations of 1515 may be performed according to the methods described with reference to FIGS. 1 through 5. In certain examples, aspects of the operations of 1515 may be performed by a scrambling manager as described with reference to FIGS. 6 through 9.

At 1520 the network entity may transmit the common control information and the reference signal within the selected second frequency range of the system bandwidth. The operations of 1520 may be performed according to the methods described with reference to FIGS. 1 through 5. In certain examples, aspects of the operations of 1520 may be performed by an information communication manager as described with reference to FIGS. 6 through 9.

Figure 16:
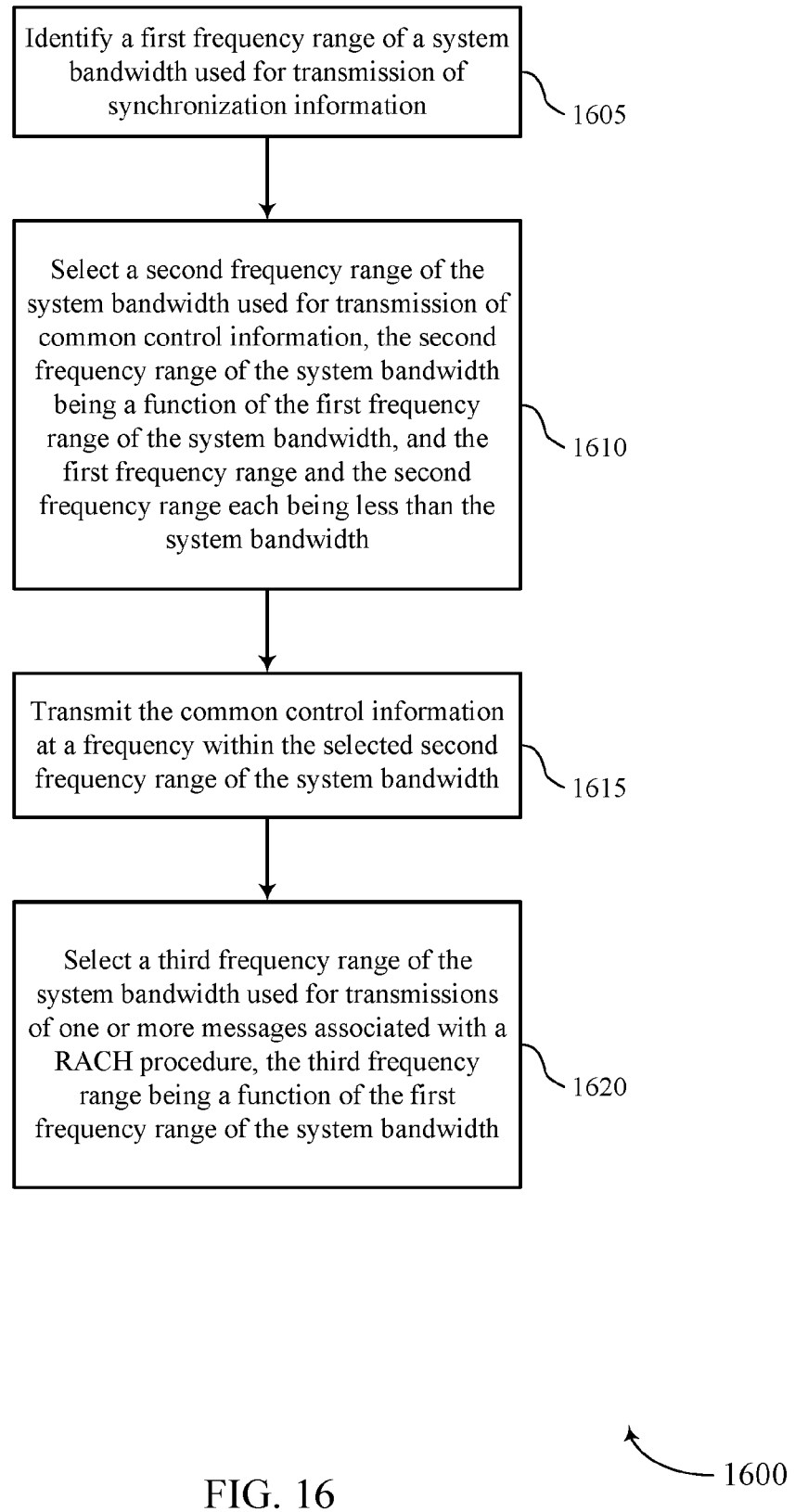

FIG. 16 shows a flowchart illustrating a method 1600 for system information block transmission in accordance with various aspects of the present disclosure. The operations of method 1600 may be implemented by a network entity or its components as described herein. For example, the operations of method 1600 may be performed by a network entity SIB transmission manager as described with reference to FIGS. 6 through 9. In some examples, a network entity may execute a set of codes to control the functional elements of the device to perform the functions described below. Additionally or alternatively, the network entity may perform aspects the functions described below using special-purpose hardware.

At 1605 the network entity may identify a first frequency range of a system bandwidth used for transmission of synchronization information. The operations of 1605 may be performed according to the methods described with reference to FIGS. 1 through 5. In certain examples, aspects of the operations of 1605 may be performed by a first frequency manager as described with reference to FIGS. 6 through 9.

At 1610 the network entity may select a second frequency range of the system bandwidth used for transmission of common control information, the second frequency range of the system bandwidth being a function of the first frequency range of the system bandwidth, and the first frequency range and the second frequency range each being less than the system bandwidth. The operations of 1610 may be performed according to the methods described with reference to FIGS. 1 through 5. In certain examples, aspects of the operations of 1610 may be performed by a second frequency manager as described with reference to FIGS. 6 through 9.

At 1615 the network entity may transmit the common control information at a frequency within the selected second frequency range of the system bandwidth. The operations of 1615 may be performed according to the methods described with reference to FIGS. 1 through 5. In certain examples, aspects of the operations of 1615 may be performed by an information communication manager as described with reference to FIGS. 6 through 9.

At 1620 the network entity may select a third frequency range of the system bandwidth used for transmissions of one or more messages associated with a random access channel (RACH) procedure, the third frequency range being a function of the first frequency range of the system bandwidth. The operations of 1620 may be performed according to the methods described with reference to FIGS. 1 through 5. In certain examples, aspects of the operations of 1620 may be performed by a RACH manager as described with reference to FIGS. 6 through 9.

Figure 17:
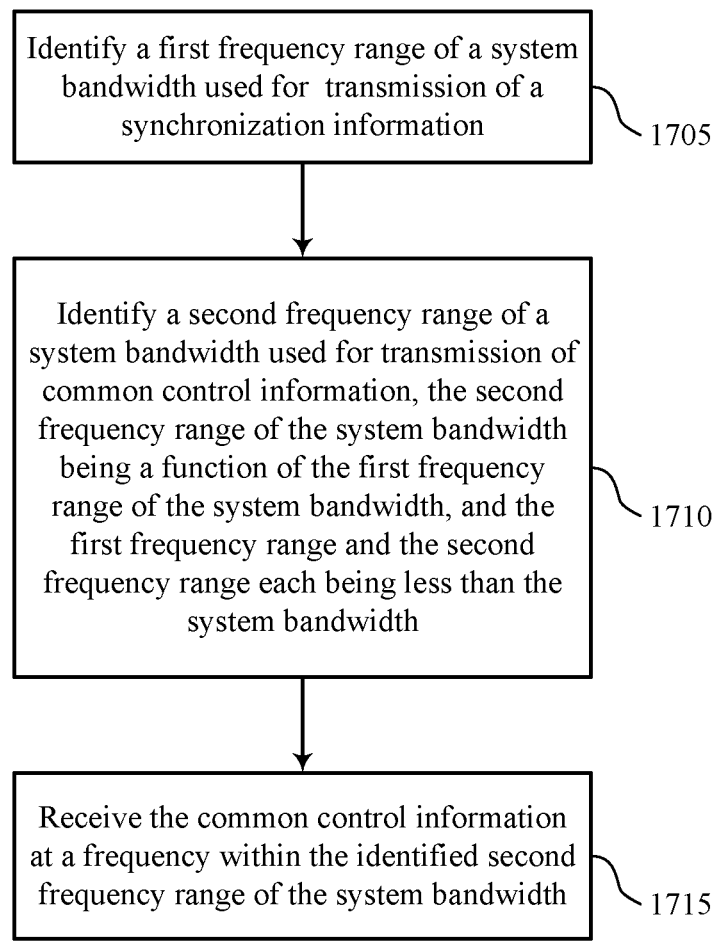

FIG. 17 shows a flowchart illustrating a method 1700 for system information block transmission in accordance with various aspects of the present disclosure. The operations of method 1700 may be implemented by a UE 115 or its components as described herein. For example, the operations of method 1700 may be performed by a UE SIB transmission manager as described with reference to FIGS. 10 through 13. In some examples, a UE 115 may execute a set of codes to control the functional elements of the device to perform the functions described below. Additionally or alternatively, the UE 115 may perform aspects the functions described below using special-purpose hardware.

At 1705 the UE 115 may identify a first frequency range of a system bandwidth used for transmission of a synchronization information. The operations of 1705 may be performed according to the methods described with reference to FIGS. 1 through 5. In certain examples, aspects of the operations of 1705 may be performed by a first frequency manager as described with reference to FIGS. 10 through 13.

At 1710 the UE 115 may identify a second frequency range of a system bandwidth used for transmission of common control information, the second frequency range of the system bandwidth being a function of the first frequency range of the system bandwidth, and the first frequency range and the second frequency range each being less than the system bandwidth. The operations of 1710 may be performed according to the methods described with reference to FIGS. 1 through 5. In certain examples, aspects of the operations of 1710 may be performed by a second frequency manager as described with reference to FIGS. 10 through 13.

At 1715 the UE 115 may receive the common control information and a reference signal within the identified second frequency range of the system bandwidth. The UE 115 may descramble the reference signal used to decode the common control information according to a scrambling scheme. The operations of 1715 may be performed according to the methods described with reference to FIGS. 1 through 5. In certain examples, aspects of the operations of 1715 may be performed by an information communication manager as described with reference to FIGS. 10 through 13.

It should be noted that the methods described above describe possible implementations, and that the operations and the steps may be rearranged or otherwise modified and that other implementations are possible. Furthermore, aspects from two or more of the methods 1400, 1500, 1600, or 1700 described with reference to FIG. 14, 15, 16, or 17 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier FDMA (SC-FDMA), DFT-s-OFDM, and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a first frequency range of a system bandwidth used for transmission of a synchronization information;
   identifying a second frequency range of the system bandwidth used for transmission of common control information, the second frequency range of the system bandwidth being a first function of the first frequency range of the system bandwidth, and the first frequency range and the second frequency range each being less than the system bandwidth;
   receiving the common control information within the identified second frequency range of the system bandwidth; and
   descrambling a reference signal used to decode the common control information according to a scrambling scheme, the scrambling scheme being a second function of the first frequency range of the system bandwidth.

2. The method of claim 1, wherein the first frequency range and the second frequency range are a same frequency range.

3. The method of claim 1, wherein the scrambling scheme comprises use of a scrambling sequence to scramble the reference signal associated with the second frequency range that is different from a system scrambling sequence to scramble other reference signals associated with frequencies outside of the second frequency range.

4. The method of claim 1, wherein the scrambling scheme comprises use of a mid-tone scrambling sequence that begins at a center frequency of the second frequency range and proceeds outward through the system bandwidth.

5. The method of claim 1, further comprising:
   identifying a third frequency range of the system bandwidth used for transmission of one or more messages associated with a random access channel (RACH) procedure, the third frequency range being a third function of the first frequency range of the system bandwidth.

6. The method of claim 5, further comprising:
   transmitting a pre-RACH transmission to a base station at a frequency within the third frequency range; and
   receiving, responsive to the pre-RACH transmission, the common control information from the base station.

7. The method of claim 6, wherein the common control information is received according to a beamforming direction that is indicated by the pre-RACH transmission.

8. The method of claim 1, wherein the common control information comprises a downlink transmission, the downlink transmission comprising a system information block (SIB) transmitted on a physical downlink control channel (PDCCH) or a downlink grant for a physical downlink shared channel (PDSCH) carrying the SIB.

9. The method of claim 1, wherein the common control information comprises a system information block (SIB), the SIB indicating the system bandwidth, a raster offset, or both.

10. The method of claim 1, further comprising:
    receiving the common control information according to a cyclic shift pattern, wherein the cyclic shift pattern comprises one or more blocks of tones conveying the common control information.

11. The method of claim 1, wherein the synchronization information comprises at least one of a primary synchronization signal (PSS), a secondary synchronization signal (SSS), a broadcast signal, a physical broadcast channel (PBCH), or any combination thereof.

12. A method for wireless communication, comprising:
    identifying a first frequency range of a system bandwidth used for transmission of synchronization information;
    selecting a second frequency range of the system bandwidth used for transmission of common control information, the second frequency range of the system bandwidth being a first function of the first frequency range of the system bandwidth, and the first frequency range and the second frequency range each being less than the system bandwidth;
    transmitting the common control information at a frequency within the selected second frequency range of the system bandwidth; and
    selecting a scrambling scheme for a reference signal used to decode the common control information, the scrambling scheme being a second function of the first frequency range of the system bandwidth.

13. The method of claim 12, wherein the first frequency range and the second frequency range are a same frequency range.

14. The method of claim 12, further comprising:
    selecting a third frequency range of the system bandwidth used for transmissions of one or more messages associated with a random access channel (RACH) procedure, the third frequency range being a third function of the first frequency range of the system bandwidth.

15. The method of claim 14, further comprising:
    receiving a pre-RACH transmission from a user equipment (UE) at a frequency within the third frequency range; and
    transmitting, responsive to receiving the pre-RACH transmission, the common control information to the UE.

16. The method of claim 15, wherein the common control information is transmitted according to a beamforming direction that is indicated by the pre-RACH transmission.

17. The method of claim 12, further comprising:
    selecting a cyclic shift pattern for one or more blocks of tones conveying the common control information; and
    transmitting the common control information according to the cyclic shift pattern.

18. The method of claim 17, further comprising:
selecting a set of clusters for a multi-cluster discrete Fourier transform-spread-orthogonal frequency division multiplexing (DFT-s-OFDM) scheme, wherein each cluster in the multi-cluster DFT-s-OFDM scheme is associated with a different discrete Fourier transform (DFT) spreading function, wherein the set of clusters identify the one or more blocks of tones; and
transmitting the common control information according to the set of clusters.

19. The method of claim 12, wherein the common control information comprises a downlink transmission, the downlink transmission comprising a system information block (SIB) transmitted on a physical downlink control channel (PDCCH) or a downlink grant for a physical downlink shared channel (PDSCH) carrying the SIB.

20. The method of claim 19, further comprising:
transmitting the SIB in the common control information using a fixed frequency allocation, a known modulation order, a known scrambling order, or a combination thereof.

21. The method of claim 12, further comprising:
encoding the synchronization information to convey information associated with a system information block (SIB), wherein the information is a fourth function of the synchronization information.

22. An apparatus for wireless communication, in a system comprising:
a processor;
memory in electronic communication with the processor; and
instructions stored in the memory and operable, when executed by the processor, to cause the apparatus to:
identify a first frequency range of a system bandwidth used for transmission of a synchronization information;
identify a second frequency range of the system bandwidth used for transmission of common control information, the second frequency range of the system bandwidth being a first function of the first frequency range of the system bandwidth, and the first frequency range and the second frequency range each being less than the system bandwidth;
receive the common control information and a reference signal within the identified second frequency range of the system bandwidth; and
descramble a reference signal used to decode the common control information according to a scrambling scheme, the scrambling scheme being a second function of the first frequency range of the system bandwidth.

23. The apparatus of claim 22, wherein the instructions are further executable by the processor to:
identify a third frequency range of the system bandwidth used for transmission of one or more messages associated with a random access channel (RACH) procedure, the third frequency range being a third function of the first frequency range of the system bandwidth.

24. The apparatus of claim 22, wherein the instructions are further executable by the processor to:
receive the common control information according to a cyclic shift pattern, wherein the cyclic shift pattern comprises one or more blocks of tones conveying the common control information.

25. An apparatus for wireless communication, in a system comprising:
a processor;
memory in electronic communication with the processor; and
instructions stored in the memory and operable, when executed by the processor, to cause the apparatus to:
identify a first frequency range of a system bandwidth used for transmission of synchronization information;
select a second frequency range of the system bandwidth used for transmission of common control information, the second frequency range of the system bandwidth being a first function of the first frequency range of the system bandwidth, and the first frequency range and the second frequency range each being less than the system bandwidth;
transmit the common control information within the selected second frequency range of the system bandwidth; and
select a scrambling scheme for a reference signal used to decode the common control information, the scrambling scheme being a second function of the first frequency range of the system bandwidth.

26. The apparatus of claim 25, wherein the instructions are further executable by the processor to:
select a cyclic shift pattern for one or more blocks of tones conveying the common control information; and
transmit the common control information according to the cyclic shift pattern.

* * * * *